(12) United States Patent
Russo

(10) Patent No.: US 7,197,168 B2
(45) Date of Patent: Mar. 27, 2007

(54) METHOD AND SYSTEM FOR BIOMETRIC IMAGE ASSEMBLY FROM MULTIPLE PARTIAL BIOMETRIC FRAME SCANS

(75) Inventor: Anthony P. Russo, New York, NY (US)

(73) Assignee: Atrua Technologies, Inc., Campbell, CA (US)

( * ) Notice: Subject to any disclaimer, the term of this patent is extended or adjusted under 35 U.S.C. 154(b) by 809 days.

(21) Appl. No.: 10/194,994

(22) Filed: Jul. 12, 2002

(65) Prior Publication Data

US 2003/0126448 A1    Jul. 3, 2003

Related U.S. Application Data

(60) Provisional application No. 60/305,120, filed on Jul. 12, 2001.

(51) Int. Cl.
*G06K 9/00* (2006.01)

(52) U.S. Cl. .................................... 382/125

(58) Field of Classification Search ........ 382/124–127, 382/193, 195, 209, 215–217; 340/5.53, 5.83; 902/3; 713/186
See application file for complete search history.

(56) References Cited

U.S. PATENT DOCUMENTS

| 4,222,076 A | 9/1980 | Knowlton |
| 4,405,829 A | 9/1983 | Rivest et al. |
| 4,558,372 A | 12/1985 | Culter |
| 4,654,876 A | 3/1987 | Atkins |
| 5,144,448 A | 9/1992 | Hornbaker, III et al. |
| 5,155,597 A | 10/1992 | Lareau et al. |
| 5,227,839 A | 7/1993 | Allen |
| 5,293,323 A | 3/1994 | Doskocil et al. |
| 5,444,478 A | 8/1995 | Lelong et al. |

(Continued)

FOREIGN PATENT DOCUMENTS

WO      WO 01/06445 A1      1/2001

(Continued)

OTHER PUBLICATIONS

"Large Arizona County Attorney's Office Selects Indentix's Security Solutions to Replace Passwords for Secure Access to Court Records", PR Newswire, Aug. 7, 2001.

(Continued)

*Primary Examiner*—Vikkram Bali
(74) *Attorney, Agent, or Firm*—Perkins Coie LLP

(57) ABSTRACT

Method and system for reconstructing seamless fingerprint image from set of image slices, or frames, from fingerprint swipe sensor. Robust normalized cross-correlation procedures are used for frame evaluation and image matching. Efficient use of device processing resources including memory by keeping only data frames that indicate moving finger and discards frames where no finger exists at sensor during acquisition or finger has not moved since last frame was acquired. Capability to adjust sensor settings during acquisition process to obtain optimal results. Logic ensures operation across different physical systems and sensor characteristics with varying acquisition speeds. Statistics regarding resulting reconstructed image and finger swiping process are computed and embedded in reconstructed image and are useful to the downstream fingerprint matching system, and by embedding in image, inventive system and method ensure that any fingerprint processing system can use information if when called upon to do so.

121 Claims, 10 Drawing Sheets

U.S. PATENT DOCUMENTS

| | | | |
|---|---|---|---|
| 5,453,777 | A | 9/1995 | Pensavecchia et al. |
| 5,456,256 | A | 10/1995 | Schneider et al. |
| 5,559,961 | A | 9/1996 | Blonder |
| 5,576,763 | A | 11/1996 | Ackland et al. |
| 5,577,120 | A | 11/1996 | Penzias |
| 5,602,585 | A | 2/1997 | Dickinson et al. |
| 5,623,552 | A | 4/1997 | Lane |
| 5,625,304 | A | 4/1997 | Azadet et al. |
| 5,631,704 | A | 5/1997 | Dickinson et al. |
| 5,668,874 | A | 9/1997 | Kristol et al. |
| 5,671,279 | A | 9/1997 | Elgamal |
| 5,673,123 | A | 9/1997 | Dickinson |
| 5,739,562 | A | 4/1998 | Ackland et al. |
| 5,764,789 | A | 6/1998 | Pare, Jr. et al. |
| 5,768,439 | A | 6/1998 | Suzuka et al. |
| 5,774,525 | A | 6/1998 | Kanevsky |
| 5,812,704 | A | 9/1998 | Pearson et al. |
| 5,825,907 | A | 10/1998 | Russo |
| 5,835,141 | A | 11/1998 | Ackland et al. |
| 5,864,296 | A | 1/1999 | Upton |
| 5,903,225 | A | 5/1999 | Schmitt et al. |
| 5,920,640 | A | 7/1999 | Salatino et al. |
| 5,963,679 | A | 10/1999 | Setlak |
| 5,987,156 | A | 11/1999 | Ackland et al. |
| 5,991,408 | A | 11/1999 | Pearson et al. |
| 6,003,135 | A | 12/1999 | Bialick et al. |
| 6,016,355 | A | 1/2000 | Dickinson et al. |
| 6,016,476 | A | 1/2000 | Maes et al. |
| 6,047,268 | A | 4/2000 | Bartoli et al. |
| 6,049,620 | A | 4/2000 | Dickinson et al. |
| 6,069,970 | A | 5/2000 | Salatino et al. |
| 6,097,418 | A | 8/2000 | Larsen et al. |
| 6,175,922 | B1 | 1/2001 | Wang |
| 6,192,142 | B1 | 2/2001 | Pare, Jr. et al. |
| 6,195,447 | B1 | 2/2001 | Ross |
| 6,195,471 | B1 | 2/2001 | Larsen |
| 6,202,151 | B1 | 3/2001 | Musgrave et al. |
| 6,208,264 | B1 | 3/2001 | Bradney et al. |
| 6,219,793 | B1 | 4/2001 | Li et al. |
| 6,230,148 | B1 | 5/2001 | Pare, Jr. et al. |
| 6,230,235 | B1 | 5/2001 | Lu et al. |
| 6,256,737 | B1 | 7/2001 | Blanco et al. |
| 6,260,300 | B1 | 7/2001 | Klebes et al. |
| 6,289,114 | B1 | 9/2001 | Mainguet |
| 6,310,966 | B1 | 10/2001 | Dulude et al. |
| 6,330,345 | B1 | 12/2001 | Russo et al. |
| 6,333,989 | B1 | 12/2001 | Borza |
| 6,366,682 | B1 | 4/2002 | Hoffman et al. |
| 6,459,804 | B2 | 10/2002 | Mainguet |
| 6,501,846 | B1 | 12/2002 | Dickinson et al. |
| 6,518,560 | B1 | 2/2003 | Yeh et al. |
| 6,535,622 | B1 | 3/2003 | Russo et al. |
| 6,538,456 | B1 | 3/2003 | Dickinson et al. |
| 6,546,122 | B1 | 4/2003 | Russo |
| 2001/0031075 | A1* | 10/2001 | Fujii .......................... 382/125 |
| 2002/0013898 | A1 | 1/2002 | Sudia et al. |
| 2002/0060243 | A1 | 5/2002 | Janiak et al. |
| 2002/0078347 | A1 | 6/2002 | Hericourt |
| 2003/0002719 | A1* | 1/2003 | Hamid et al. ............... 382/124 |
| 2003/0021495 | A1 | 1/2003 | Cheng |
| 2003/0101348 | A1 | 5/2003 | Russo et al. |
| 2003/0115475 | A1 | 6/2003 | Russo et al. |
| 2003/0115490 | A1 | 6/2003 | Russo et al. |

FOREIGN PATENT DOCUMENTS

| | | | |
|---|---|---|---|
| WO | WO 01/80167 | * | 10/2001 |

OTHER PUBLICATIONS

Ballard & Brown, *Computer Vision*, pp. 66-69, Prentice Hall, 1982.

W.M. Campbell, and C.C. Broun, *Text-Prompted Speaker Recognition with Polynomial Classifiers*, Motorola Human Interface Laboratory, 2001.

Duda, R.O., et al., *Pattern Classification*, 2nd ed., Wiley-Interscience (2000).

Jain, A.K., et al., An Identity Authentication System Using Fingerprints, *Proc. IEEE*, vol. 85, No. 9, 1365-1388 (1997).

Jain, A.K., et al., "Fingerprint Matching Using Minutiae and Texture Features," *Proc. ICIP, Thessaloniki*, 282-285 (Oct. 2001).

Liu, Simon, and Mark Silverman, "A Practical Guide to Biometric Security Technology," IEEE Computer Society, IT Pro-Security, Jan.-Feb. 2001.

Maio, D., D. Maltoni, "Direct Gray-Scale Minutiae Detection in Fingerprints," *IEEE Trans. On Pattern Analysis Machine Intelligence*, vol. 19, No. 1, 27-40 (1997).

Smith, R.E., *Authentication: from Passwords to Public Keys*, Addison-Wesley, 29 (2002).

* cited by examiner

EXAMPLES OF PATCHES THAT ARE SUPERSETS OF A ROW:

EXAMPLES OF PATCHES THAT ARE SUBSETS OF A ROW:

METHOD AND SYSTEM FOR BIOMETRIC IMAGE ASSEMBLY FROM MULTIPLE PARTIAL BIOMETRIC FRAME SCANS

RELATED APPLICATIONS

Priority is claimed under 35 USC 120 and/or 35 USC 119(e) to: U.S. Patent Application Ser. No. 60/305,120 filed Jul. 12, 2001 and entitled "SYSTEM, METHOD, DEVICE AND COMPUTER PROGRAM FOR NON-REPUDIATED WIRELESS TRANSACTIONS"; U.S. patent application Ser. No. 10/099,554 filed Mar. 13, 2002 and entitled "SYSTEM, METHOD, AND OPERATING MODEL FOR MOBILE WIRELESS NETWORK-BASED TRANSACTION AUTHENTICATION AND NON-REPUDIATION"; and U.S. patent application Ser. No. 10/099,558 filed Mar. 13, 2002 and entitled "FINGERPRINT BIOMETRIC CAPTURE DEVICE AND METHOD WITH INTEGRATED ON-CHIP DATA BUFFERING"; each of which applications are incorporated by reference herein.

This application further relates to the following additional co-pending patent applications: U.S. application Ser. No. 10/194,959, filed 12 Jul. 2002 and entitled "METHOD AND SYSTEM FOR DETERMINING CONFIDENCE IN A DIGITAL TRANSACTION"; U.S. application Ser. No. 10/194,444, filed 12 Jul. 2002 and entitled "BIOMETRICALLY ENHANCED DIGITAL CERTIFICATES AND SYSTEM AND METHOD FOR MAKING AND USING"; and U.S. application Ser. No. 10/194,949, filed 12 Jul. 2002 and entitled "SECURE NETWORK AND NETWORKED DEVICES USING BIOMETRICS"; all of which applications are hereby incorporated by reference.

FIELD OF THE INVENTION

This invention relates generally to the field of systems, devices, methods, computer programs and computer program products for generating or reconstructing an image from a plurality of partial images and more particularly to systems, devices, methods, computer programs and computer program products for reconstructing a two-dimensional image of a biometric from a plurality of smaller partial biometric images, and even more particularly to reconstruction of two-dimensional fingerprint biometrics from substantially one-dimensional partial fingerprint scans.

BACKGROUND

Biometric systems are gaining in popularity as a convenient, secure way to authenticate a person's identity to a computer or other system, device, environment, information or information system or database, or other protected or limited access capability. This allows systems to grant or deny access to a particular user. Access can be to a service, to information, or to a physical entity such as room. Fingerprints, used by the Federal Bureau of Investigation (FBI) and other law enforcement and forensic agencies for decades, are a very reliable means of verifying identity. Most conventional automatic fingerprint systems in use today consist of an electronic fingerprint sensor, a host computer such as a small general purpose or personal computer (PC) or computer processing unit, and fingerprint comparison and matching software that can analyze and compare a fingerprint image to one (or one of a large set stored in a fingerprint database) stored previously, for instance a fingerprint acquired and stored during enrollment for some sort of employment, military service, drivers license registration, law enforcement arrest and incarceration, or other service, or for any other reason.

Fingerprints all consist of physical ridges and valleys on the surface of the finger, as shown in FIG. 1B. In this figure ridges are in black and valleys are in white. Interesting minutiae points used for matching are identified either by rectangles overlaid on the image to indicate a ridge ending or by a circle to indicate a bifurcation. The two-dimensional pattern of ridges and valleys has proven to be unique among very large populations of human beings, especially the ridge endings and bifurcations called or referred to a fingerprint "minutiae."

Electronic fingerprint sensors, until about the mid-1990's, were all designed to actively sense the entire surface of a fingerprint at the same time and were frequently referred to as contact or placement sensors. Whether based on optical or electrical sensing methods, all such sensors were designed to be at least as large as a typical person's fingertip (typically about 15 cm×15 cm) or at least the portion of significance having the minutiae. The user simply placed his or her finger tip on the sensor device until the image was captured. These devices are now known as placement sensors and they capture large images, typically ranging from 250–500 rows and 200–500 columns depending on the sensor's capabilities and size. These sensors were satisfactory for some applications where the space occupied by the sensor (and possibly by supporting electronics associated with the sensor) could be tolerated. In many instances size had not been an issue because the relatively large surface of for example even a portable device such as a notebook computer adjacent the keyboard may have been available for such placement. Other applications may have provided for a separate box or enclosure for the placement sensor, again reducing the importance of physical size.

However, as companies worked to reduce the cost of fingerprint sensing devices, they soon realized the only way to do that would be to reduce the actual size of the device, at least in part because the cost of the fingerprint sensor increases dramatically as the size increases, particularly for silicon based sensors where cost increases as a function of silicon area. Miniaturization was and still is a very desirable trait for a fingerprint sensor, because aside from the cost reduction, the smaller a sensor the easier it is to embed such sensors in common devices such as laptop computers, PDAs, mobile phones, or other information appliances or communication devices.

The most promising of the miniaturization approaches involves creating a sensor that is fully sized in one direction (typically in width) but abbreviated in the other (typically height). It is appreciated that width and height are somewhat arbitrary descriptions of the two orthogonal sensor dimensions. This results in a sensor that only is capable of sensing a small rectangular portion of the finger at any one time. Unlike placement sensors, a user must sweep his or her finger along the device in order to capture a full image of the finger. As the user sweeps, the rectangular slices, or frames, take snapshots of the finger as it moves by. The width dimension is captured each time and the other dimension is built up from combinations of the abbreviated height dimensions. To create an image for use by standard fingerprint processing systems, the individual frames must then be aligned, and redundant information thrown away, in order to generate or "reconstruct" the desired image corresponding to the original object (fingertip portion) so that the seams between frames are not apparent in the generated or reconstructed image. If this could be done well, then the resulting reconstructed image would look indistinguishable from images captured with a placement sensor of the same type that collects or acquires an image of the original object all at the same time.

One example of a fingerprint swipe sensor is described in U.S. Pat. No. 6,289,114 entitled FINGERPRINT-READING SYSTEM, incorporated by reference herein. This patent describes a system in which the surface area of this sensor is far smaller than the surface area of the fingerprint to be read. The reading is done when the sensor and the finger are in contact and in a relative motion of sliding of the sensor and the finger with respect to each other. The system reconstitutes a complete image of the fingerprint from the partial images given by the sensor during this motion. The manner in which the system reconstitutes a complete image of the fingerprint from the partial images given by the sensor is not described.

SUMMARY

The invention provides device, system, method, procedure, computer program and computer program product for acquiring partial imagery data and combining the imagery data in an intelligent manner to reconstruct a larger composite image from the partial imagery data. In one embodiment, this partial imagery data is in the form of electrical signals generated from a capacitive (or other) fingerprint swipe sensor, though the invention is applicable to many different types of line scanners, push-broom type image sensors, or other imaging devices.

In one aspect the invention provides method, procedures, and algorithm, and computer program and computer program product in the form of computers software and/or firmware, that effectively and efficiently reconstructs a full (or any desired portion of), seamless fingerprint image from a set of image slices, or frames, from a fingerprint swipe sensor. The new invention described herein improves upon the conventional systems, devices, methods, and procedures in significant ways. For example, by way of illustration but not limitation, the invention uses normalized cross-correlation procedures that work better in image processing than conventional routine correlation approaches. Furthermore, the invention makes efficient use of device processing (computer or microprocessor) resources including memory by keeping only those data frames from the device that indicate a moving finger, and throws away or discards those frames where no finger exists at the sensor during frame acquisition or the finger has not moved since the last frame was acquired. In addition, the inventive method and procedures have the capability to adjust sensor settings during the acquisition process to obtain optimal results for a given person's finger. It also has procedural logic to ensure operation works properly across many different physical systems and sensor characteristics with varying acquisition speeds, and includes procedural logic to gracefully handle conditions where the user swipes too quickly. Furthermore, embodiments of the invention keep statistics regarding the resulting reconstructed image and the finger swiping process, which are then embedded in the reconstructed image itself. These statistics, such as the angle of the swipe direction, swipe speed, and other acquisition characteristics and parameter can be useful to the downstream fingerprint matching system, and by embedding them in the image itself, the inventive system and method ensure that any fingerprint processing system can use the information if when called upon to do so. The invention also provides a file or other data structure storing biometric data and biometric acquisition data and other information.

In one aspect, the invention provides a method for generating a composite biometric image from a plurality of acquired frames, where the method includes: acquiring a new frame imaging a portion of a biometric; comparing the acquired new frame with at least one earlier acquired frame to determine if any registration alignment exists between the portions of the acquired new frame with the portions of the at least one earlier acquired frame; augmenting the at least one earlier acquired frame with the acquired new frame in registration if any registration alignment is determined to exist between portions of the acquired new frame with portions of the at least one earlier acquired frame; and repeating the acquiring, comparing, and augmenting until the composite biometric has been generated.

In another aspect, the invention provides a method for acquiring a plurality of biometric image frames from a sensor and generating a reconstructed composite image from at least some of the plurality of acquired biometric image frames, the method includes: acquiring a frame from the sensor and storing the acquired frame in a memory as a last stored frame; comparing the stored frame to the reconstructed composite image to determine any usefulness and any alignment registration relationship between the acquired frame and the reconstructed composite image that is being generated; updating the generated reconstructed composite image to incorporate at least a portion of the acquired frame to extend the length (height) of the generated reconstructed composite image and storing the updated generated reconstructed composite image in a memory; determining if frame acquisition should be stopped according to a frame acquisition stop criteria; and if it is determined that frame acquisition should be stopped then stopping acquiring frames and identifying the then currently updated generated reconstructed composite image as the final generated reconstructed composite image, and otherwise repeating the procedure of acquiring additional frames through determining if frame acquisition should be stopped until it is determined that frame acquisition should be stopped.

In another aspect, the invention provides a system for generating a biometric image, the system including: a processor for executing computer program commands in the form of executable program instructions and memory coupled with the processor for storing data and commands; a biometric sensor generating an output data stream representing at least one frame of sensed biometric data and coupling the output data stream to the processor; and means coupled to or integrated with the processor, for receiving the output data stream and for generating a reconstructed image of the biometric. The biometric may be a fingerprint biometric and the sensor may be a capacitive, thermal, pressure, or other contact type swipe sensor having a smaller area or size in at least one dimension than the area or size biometric to be captured.

In another aspect the invention provides a computer program and computer program product for implementing any one or a combination of the methods and procedures of the invention.

In another aspect the invention provides a data structure or data token including a biometric image comprising a two-dimensional array of pixel data; and non-pixel information associated with the biometric image and embedded within the biometric image.

In another aspect, the invention provides a mobile communication device such as a mobile wireless telephone or personal data assistant with a capability to acquire a biometric information from the user of that device in a very small fingerprint swipe sensor area by building up the image from a plurality of frames using real-time or non-real time image generation and reconstruction from the acquired frames.

DETAILED DESCRIPTION OF EMBODIMENTS

Exemplary Embodiment

Figure 1A:
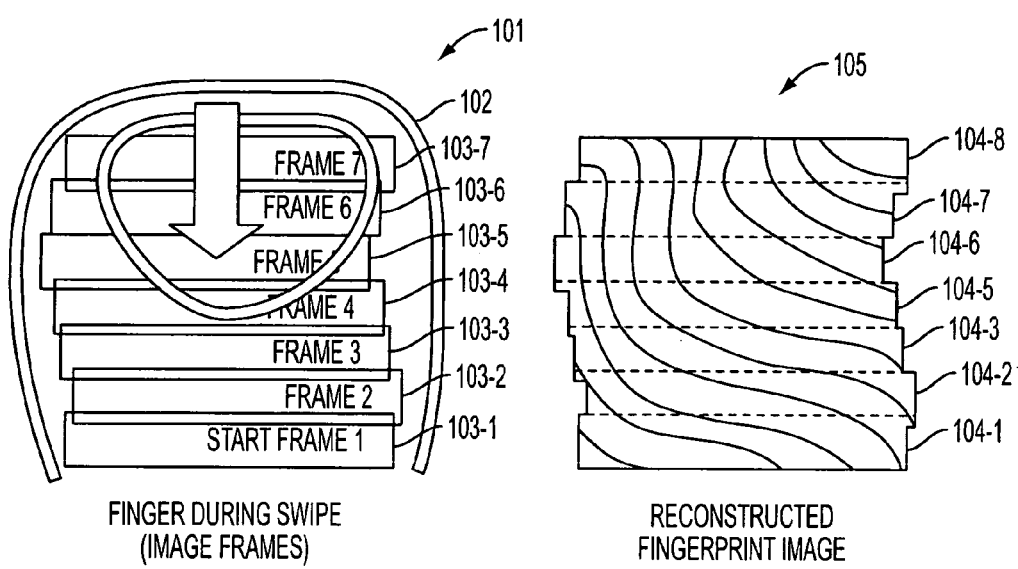
FIG. 1A is a diagrammatic illustration showing an embodiment of finger during a fingertip swipe using a swipe type sensor showing image frames relative to the movement of the finger and the reconstructed finger print image derived from those frames.
Figure 1B:
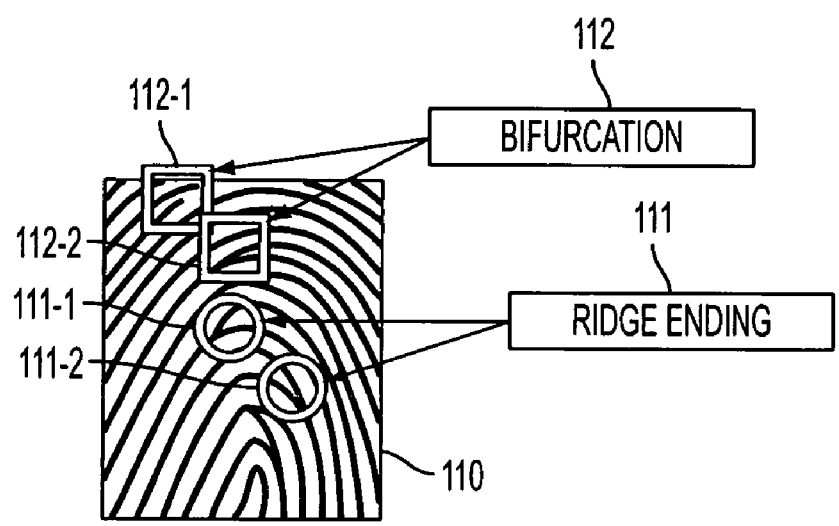
FIG. 1B is a diagrammatic illustration showing an embodiment of a fingerprint image where ridges are shown in black and valleys are shown in white and indicating areas for bifurcation and ridge endings.

A first exemplary embodiment of the inventive image generation or image reconstruction algorithm and method and procedures within that method are now described with reference to the flowchart in FIG. 3. Note that we may refer to this process as either image generation because we are in fact generating an image (and effectively an electronic signal or data representing that image) from individual frames or alternatively reconstructing an image from individual frames, none of which individual linear scans or images frames actually providing an image of the fingerprint or other biometric.

It will also be noted that the inventive system, method, algorithm, and computer program and computer program product permit generation or reconstruction of all or any part of the fingerprint or other biometric, and that the generation or reconstruction may be adapted to generate or reconstruct a plurality of pieces or sub-portions of what may be considered the full or complete fingerprint (biometric) image. By generating sub-portions, such as for example, $1/16$, $1/10$, $1/8$, $1/4$, $1/2$, or any other sub-portion, post processing of the generated images may be accomplished over these sub-portions. For example, minutiae extraction may be performed separately over a sub-portion rather than over the full or complete fingerprint or biometric. This may advantageously reduce memory storage and/or processing requirements.

It will be appreciated that the inventive method is advantageously implemented as a computer program and computer program product executing on or within a controller, micro-controller, processor, central processing unit (CPU) or other circuit, machine, or device adapted to execute instructions in a computer software program, a computer firmware program, in specialized hardware, or using a combination of one or more of such software, firmware, and/or hardware.

Exemplary Sensor Elements Usable with the Inventive System and Method

The inventive system, method, algorithm, and computer program and computer program product may be used with a variety of sensor devices. For example it may be used with a sensor (prototype of Model ICS-3000) being developed by IControl Transactions, Inc. of Campbell, Calif. This sensor device features a swipe sensor array including 8 rows×192 columns and a sensor element pitch of 70 microns that provide a resolution of 363 dots per inch (DPI). It includes an integrated analog-to-digital converter, an integrated surface-contact-detector, and automatic gain control for image gray scale (intensity). It has a low power consumption and operates at from 2.5 V to 3.3 V, consuming 1 milliamp to 25 milliamps in operation and less than 50 microamps in sleep mode (with surface-contact-detection enabled) and less than 5 microamps at full power-down. It has a fast 40 nanosecond access time and can generate at 3700 frames per second. It is a capacitive solid-state linear swipe sensor that captures a fingerprint image frame-by-frame as a finger is swiped over the small, linear sensing area. Advantageously it has a 15 kilovolt electro-static discharge (ESD) tolerance. The sensor is compact having only a 0.56 mm×13.44 mm active sensing area with a 2.85 mm×16.65 mm×0.3 mm Sensor Size. It uses an 8-bit peripheral bus interface and may advantageously use a 50 mm flexible printed circuit ribbon cable for connection with external devices.

Using the inventive reconstruction software described herein the inventive system and method re-assembles a fingerprint image from the received frames while maximizing contrast and sensitivity across various environmental conditions. This approach dramatically reduces sensor size, lowering cost and reducing power. The sensor's compact size is ideal for integration into multi-function devices such as smart phones, mobile phones, personal digital assistants (PDA's) and PDA-communicators, laptop/notebook computers, smart cards, PC Peripheral's, Universal Serial Bus (USB) devices and tokens, Point-of-Sale (POS) terminals, keyboards, mice, PCMCIA, PC card, compact flash, Sony Memory Stick™, and smart card readers and more as well as other electronic devices, environments, facilities, or in other instances where access control is desired.

In this embodiment, the fingerprint sensor provides a single frame of data to the computer program upon request or according to other programmatic control, and may have various settings to adjust the parameters of the sensed image, such as for example, the quality of the sensed image for a given person's fingerprint characteristics. Sensors that can or do provide more than one frame per request, or sensors for which no image adjustment settings or which have no adjustable parameters to apply, are nonetheless acceptable for use with the invention without loss of the invention's generality.

Figure 2:
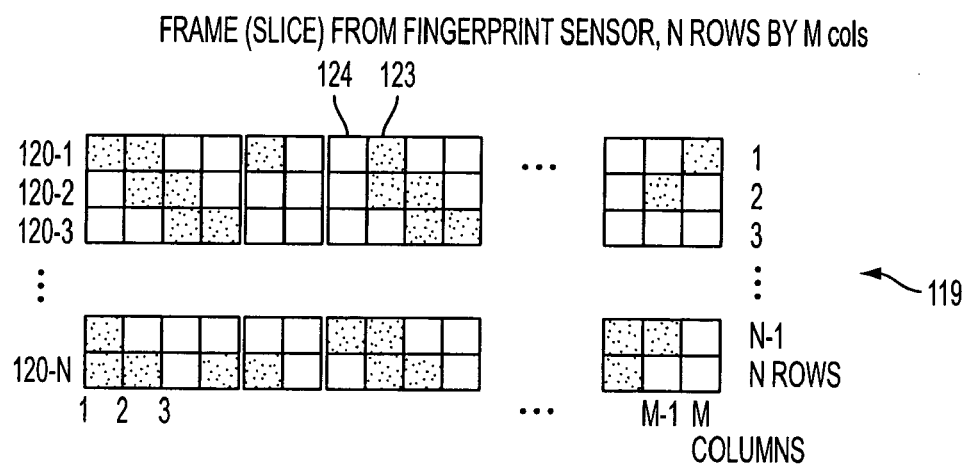
FIG. 2 is a diagrammatic illustration showing an embodiment of a frame (slice) from a fingerprint sensor.

As shown in FIG. 2, the image data is comprised of N rows by M columns (N×M) of picture elements, or pixels, each pixel represented by a plurality of bits usually in the form of a single byte (8 bits) of data. More than 8-bit data is not typically required but may be used. Fewer than 8-bits may be used according to the data resolution required but may be less compatible with existing commercial hardware and/or software.

It will be appreciated that in a typical implementation, the number of columns (M) may correspond to the number of sensor elements in the "width" dimension of the sensor as described above. The number of rows (N) may typically be larger than the number of elements in the sensor, which will be one (1) in many embodiments of the invention. M (the number of columns in the scanned image data array) can be any positive value, such as a value in any range between 1 and 1000, however M is typically several times larger than N and usually between about 100 and 500, more typically between 200 and 400, and more usually between 200 and 300. N (the number of rows in the scanned image data array) must be at least 2 and is more typically between 2 and 128, more usually between 4 and 64, and typically the number of rows in a frame is between about 8 and 32. The number need not be a power of two. A pixel's value is a gray level, brightness/darkness, or intensity, such that the image frame resembles a fingerprint image when displayed on a computer monitor. Polarity or contrast may be reversed so that either ridges are dark and valleys light or ridges may be bright and valleys dark. In one embodiment, the pixel value ranges from 0 to 255, with 0 representing black and indicating the presence of a fingerprint ridge, and 255 representing white and indicating the presence of a valley. Other ranges of data and other representations of such data are possible without affecting the nature or scope of the invention.

It will be appreciated by workers in the art in light of the description provide here, that although attention is directed to operation of the inventive method, algorithm, and computer program and computer program product, with fingerprint swipe sensor, other embodiments of the invention may utilize other types of sensors, scanners, or image generation or capture devices. It is possible, in alternate embodiments, to use the system and method with little or no modification, with other types of sensors, for example using optical document scanners or various types of push-broom or successive scan line type sensors. The inventive method and procedures may be executed as software in a general purpose computing machine or may be executed in specialized hardware or firmware instead of in software. Parts of the inventive method, procedures, and algorithm may run from a CPU or other processor or controller while other portions could be implemented solely in hardware in what may be referred to as a hybrid environment.

Embodiment of Sensor Initialization and Calibration

Figure 3:
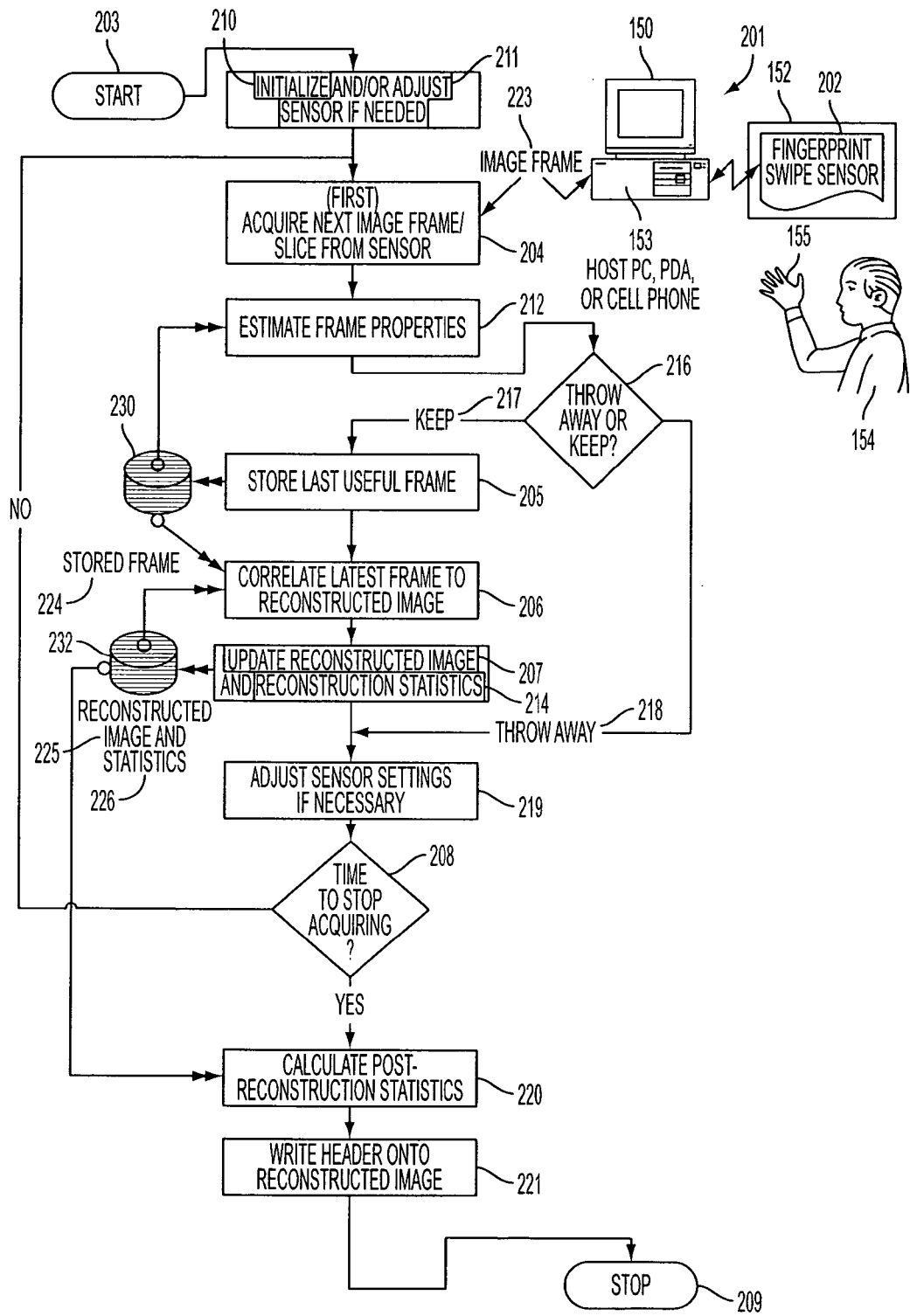
FIG. 3 is a diagrammatic illustration showing a flowchart of an embodiment of a frame acquisition and image generation or reconstruction procedure.

With further reference to the flowchart diagram of an embodiment of the biometric (fingerprint) image generation or reconstruction procedure 201 in FIG. 3, it will be noted that the fingerprint or other biometric sensor 150 is carried by or connected with some apparatus 152, usually some type of electronic device, such as a personal computer (PC), personal data assistant (PDA), cell phone or other mobile communication device. For simplicity of description this description generally assumes that the apparatus or device 152 carrying or coupled with the sensor is a cell phone 152, as one of the primary commercial applications for the biometric fingerprint sensor is in a mobile cellular telephone; however, it will be understood that reference to the cell phone or simply to the phone is a reference to any device that carries or is coupled with the sensor and adapted to provide the methodological and procedural components described here. In such case, the system would consist of or comprise the cell phone with sensor and the inventive method and procedures embodied as computer program code software and/or firmware or as special purpose processing hardware either with or without associated software and/or firmware.

In similar manner, for simplicity of description, references to fingerprint image should be interpreted as meaning any biometric image as well as any other image generated by successive linear or substantially linear scans or captures. For example, the inventive method may be adapted to generate or reconstruct imagery of any type, such as for example images captures by a digital camera, images captured by reconnaissance satellites, images captured by sonar, radar, or any other type of sensor that provides frames of data in sequential strip form.

The inventive method, procedure, and algorithm for image generation or reconstruction 201 may begin when prompted by a computer application or other computer program 153 executing on the apparatus 152, such as for example by prompting a user 154 of the device carrying the sensor to swipe his or her finger 155 across the sensor device. If the sensor is other than a fingerprint swipe sensor then the users would expose their biometric (such as their eye for a retinal scan) to the sensor, using an optical system, so that successive frames may be scanned and the image or the retinal biometric obtained. Advantageously the sensor is active and the program executing only when a finger print scan or capture event is desired to reduce computational loading, memory usage, energy consumption (sleep mode or off mode rather than an active mode), and for other reasons known in the electronic and computer arts, but both may be active all the time and simply ignored. In another embodiment of the invention, the sensor 150 is continually active or on and the optional initialization step 211 may either be eliminated or simplified.

After the procedure starts (Step 203), the next step in the inventive method and procedure is optionally to initialize the sensor (Step 210). Sensor initialization may usually be different for different sensor or sensor types, but essentially the method implemented as a computer program should turn the sensor on or transition it from a sleep state or mode to an active state or mode and make sure it is ready to image or capture a frame of the user person's fingerprint. (In embodiments where different image or biometric features are captured, such as retinal images, then it is the image of the retina that is imaged.) This process of making sure the sensor is ready to image the biometric feature may optionally include certain sensor adjustments or calibrations (Step 211) such as setting contrast and brightness levels, bias, or offsets, noise compensations, or other circuit, environmental, or operational parameters; or perhaps just setting the sensor (possibly with other circuitry) into the desired data acquisition mode. Optionally, but advantageously the process of initializing the sensor when present, including any calibrations or adjustments, is performed in an automated manner.

In one embodiment, the calibration or adjustment (Step 211) optionally but advantageously calibrates the speed of the sensor 150, the number of frames of data per second it can deliver to the inventive computer program algorithm, for later use. In one embodiment, this may be accomplished by requesting collection of some specified number of frames, usually a large number of frames and timing how long it takes. In one embodiment, 500 frames are requested for this speed calibration phase, but this number is somewhat arbitrary and any number that provides a good measure of the sensor speed may be used. When 500 frames are acquired, the calculation of the number of frames per second is given by dividing the number of frames acquired by the total time to acquire the frames, that is by the expression: Frames_per_second=500/(total time required to acquire all frames). The time period may be determined by an internal clock. Alternatively, a fixed period of time may be identified and the number of frames acquired during that fixed period of time counted. Then the frame rate or number of frames/second may be calculated by dividing the frame count by the fixed period of time.

Typically, swipe sensors are capable of delivering anywhere from about 250 to about 3000 frames per second (the "frame rate"), depending on such factors as the sensor's capabilities, the interface used, and the speed of the host PC or other receiving or controlling device. This value can be used by other parts of the inventive procedure and algorithm to ensure consistent operation and performance regardless of system frame rate.

Embodiment of Frame Acquisition and Statistical Analysis

The next phase of the inventive procedure and algorithm 201 includes iterating by requesting new frames 223 or slices of data from the sensor 150 (Step 204) and correlating the latest frame 223 to the currently (partially) reconstructed or generated image 225 (Step 226) comprising one or more previously captured frame or frames. (The second new frame will be correlated with the first frame which at that time will constitute the reconstructed image, the third frame will be correlated with the then reconstructed partial image having the correlated first and second frames, and so forth, assuming as described below that each of these frames is useful.) At the $i^{th}$ iteration, one frame of data is requested from the sensor device.

Once the frame 223 is collected, it is optionally but advantageously analyzed in two ways to determine its usefulness (Step 213) and either kept or thrown away. If a frame is deemed useful, it is kept (Step 217) and saved (Step 205) as a stored frame 224 in local memory 230 for later use; if it is deemed useless, it is simply thrown away or deleted (Step 218). In one embodiment, as a bookkeeping measure so that there is a first frame to correlate with the second frame, the first frame is saved in local memory, whether it is deemed useful or not. Put differently, the first frame is always deemed useful, but other rules or policies may be implemented relative to the first frame (collected or synthesized) so as to provide an initial frame for correlation with the second frame.

The first way of determining the usefulness of an acquired frame 223 involves making sure that the frame contains any fingerprint information at all (Step 213). The second way used to determine whether a frame is useful or not is to see if it contains any new information that did not exist in the previous last useful frame (Step 214). Either of these determinations benefit or require some determination of acquired frame properties (Step 212). These two ways (Step 213, 214) of determining usefulness (Step 212) are described in greater detail immediately below.

The first way of determining the usefulness of a frame involves evaluating frame properties (Step 212) to assess and make sure that the frame contains any fingerprint information at all (Step 213). For instance, if an image frame 223 is collected when no user finger 155 is on the sensor device 150, then that image frame 223 likely will contain only noise or a blank image. For example, between the time that the computer application program 153 requests the user 154 to swipe the finger 155 over the sensor 150 and the time the user actually swipes their finger over the sensor, many frames will be collected. In one embodiment, this determination of usefulness respective of whether there is any fingerprint information in a collected frame and hence whether the frame should be kept or discarded (Step 215) is advantageously accomplished using rules based on measuring image statistics 240 of the frame 223. In one embodiment, these statistics 240 include the average value 241 and the variance 242 of the entire collected frame 223. In an alternative embodiment, these frame property statistics are the average value and the variance of one or more selected regions less than the entire collected frame 223. Other embodiments use different rules that may be statistically based, pattern based, deterministically determined based on some relationship, or otherwise determined.

Those workers with ordinary skill in the art will appreciate in light of the descriptions provided herein that the various mathematical formulas, equations, functions, and values described may be scaled (such as by a constant scaling factor $C_S$), offset (such as by a constant offset or bias $C_O$), or otherwise modified in a way that alters the mathematical equation or function, or a value, but does not alter the fundamental relationship expressed. For example in the descriptions that follow, average values, variances, threshold values, correlations, cross-correlations, normalized correlations, normalized cross-correlations, and other relationships and values are described. Each of these may generally be modified to incorporate a scaling or an offset to place the value within a preferred range. For example, in one embodiment of a normalized cross-correlation (NCC) described below, while the mathematical value of the NCC may naturally fall in the range between 0.0 and 1.0, this particular implementation is offset by −0.5, and scaled by a multiplicative factor of 200 so that the actual range of the scaled and offset NCC is between −100 and +100. That is rather than using and comparing NCC, the expression of 200×(NCC−0.5) is used. This also means that while a threshold for comparison with NCC that would fall in the range of 0.0 to 1.0 and may for example take on a value of 0.95, would likewise be offset and scaled in the same manner as the expression being compared to so that for this example, the threshold value would become 200×(0.95−0.5)=90. In some computer implementations this is merely a conversion from real numbers to integers so that the computation may be performed more efficiently using integer number representations.

Therefore unless otherwise described, embodiments of the invention contemplate that all equations that are susceptible to having a multiplicative scale factor applied and/or an offset value, should be considered to optionally include such scaling and/or offset even if the scale factor is 1 and the offset is 0. Alternatively, the equations provided herein may be considered to disclose a proportionality (subject to a scale and offset) rather than to only an equality. An embodiment of the statistical evaluation involved in the keep/discard determination (Step 215) is now described. A pixel in the $n^{th}$ row and $m^{th}$ column of a captured frame 223 is given by the expression frame[n,m]. It will be noted that in order to clearly describe the invention without obscuration, in all equations in this description, for a frame 223 of N rows and M columns, frame[n,m] is defined as or assumed to be equal to zero (frame[n,m]=0) if any of the following are true: (i) n is less than or equal to 0 ($n \leq 0$), (ii) n is greater than N ($n > N$), (iii) m is less than or equal to zero ($m \leq 0$), or (iv) m is greater than M (m>M). This is to simplify the notation for purposes of explanation and does not affect the generality of the equations or formulas or of the applicability of the procedure, equations or formulas in any way.

Mathematically, if the pixel in the $n^{th}$ row and $m^{th}$ column is given by frame[n,m], then the frame average $\Phi$ 241 is given by the sum of the frame[n,m] over all rows and all columns (for the embodiment using the entire frame to compute statistics) divided by the product of the number of rows and the number of columns, that is:

$$FrameAverage = \Phi = \frac{\sum_{n=1}^{N}\sum_{m=1}^{M} frame[n,m]}{N \times M}; \qquad [1]$$

The frame variance $\Psi$ 242 is given by the by the sum of the frame[n,m] minus the frame average squared over all rows and all columns divided by the product of the number of rows and the number of columns, that is:

$$FrameVariance = \Psi = \frac{\sum_{n=1}^{N}\sum_{m=1}^{M} (frame[n,m] - \Phi)^2}{N \times M}. \qquad [2]$$

If we consider the optional scale factor and offsets that may generally be applied, these expressions for frame or partial frame average and frame variance become:

$$FrameAverage = \Phi = C1 \times \frac{\sum_{n=1}^{N}\sum_{m=1}^{M} frame[n,m]}{N \times M} + C2, \qquad [3]$$

where frame[n,m] is the value of a pixel in the $n^{th}$ row and $m^{th}$ column of the frame or partial frame of the acquired frame having N rows and M columns, and C1 and C2 are constants representing a frame or partial frame average scale factor and an offset respectively; and $$FrameVariance = \Psi = C3 \times \frac{\sum_{n=1}^{N}\sum_{m=1}^{M} (frame[n,m] - \Phi)^2}{N \times M} + C4 \qquad [4]$$

where frame[n,m] is the value of a pixel in the $n^{th}$ row and $m^{th}$ column of the frame or partial frame of the acquired frame having N rows and M columns and $\Phi$ is the frame average $\Phi$, and C3 and C4 are constants representing a frame or partial frame variance scale factor and offset respectively.

These equations and procedures assume that the statistics are calculated over the entire frame. For the purposes of efficiency, the statistics can alternatively calculated just using portions of the frame (rather than the entire frame), where the portions are sub-images or regions obtained by skipping every $p^{th}$ pixel in the calculation, or according to some other pixel decimation or selection rule or criteria. Hence the reference to frame or partial frame in the equations. The number of frame sensor pixels used should desirably be sufficiently large to provide a useful statistical measure, and the regions in which these pixels are selected should advantageously be representative of the entire sensor.

Based on these statistical measures 240, the frame 223 can be considered to be or contain only noise rather than any fingerprint data, and thereby thrown away or deleted, if the frame average 241 is equal to or above a high noise average threshold value 251, equal to or below a low noise average threshold value 251, or the frame variance 242 is less than or equal to a variance average threshold value 252, in mathematical form:

$$\Phi \geq Noise\_average\_threshold\_high \qquad [5],$$

or if $$\Phi \leq Noise\_average\_threshold\_low, \qquad [6]$$

or if $$\Psi \leq Variance\_average\_threshold. \qquad [7]$$

Strict inequalities of greater than or less than may be substituted for the inequalities in the above relationships and/or other magnitude relationships may be defined.

These expressions mean in somewhat simplified terms, if the average ($\Phi$) is above or below a certain level, or if the variance ($\Psi$) is less than expected for a normal finger, it may indicate—depending on the sensor used—that no finger exists or was placed on or was swiped over the device at the moment the frame was captured. In one embodiment utilizing a particular sensor device having a frame average of typically about 230 when no finger is in contact with the sensing area, a frame average of typically about 128 with a finger on the device, and for a typical finger having ridges 50 to 100 gray levels darker than those of valleys, typical values of these thresholds are set to be:

Noise_average_threshold_high=240,
Noise_average_threshold_low=30, and
Variance_average_threshold=225.

Other sensor devices may require different threshold values that may be analytically or empirically determined to provide the desired operation. Recall also that scale factors and/or offsets may be applied so that threshold values are advantageously modified in accordance with those scale factors or offsets. Note that different or other values can be used to tune the algorithm to the desired performance as can other more complicated combinations of the above statistics. Of course, other metrics, alone or in combination with the above, can also be used to determine whether a finger is present on the device or not.

The second way used to determine whether a frame is useful or not and therefore whether the frame 223 should be kept or discarded (Step 215) is to see if it contains any new information that did not exist in the previous last useful frame. Again, this benefits from determining or estimating acquired frame properties (Step 212). For example, if the current acquired frame 223 is identical (or nearly identical or the same) to the last useful frame 224 (stored in memory 230), then the current acquired frame 223 would not contain any new information. This can happen when the finger has not moved in relation to the fingerprint sensor since the prior frame was captured. Perhaps the user is moving their finger at a very slow rate relative to the frame rate or not moving it at all. Note that it is unlikely that adjacent portions of a moving finger 155 would generate identical pixels across the entire frame 223. It will be appreciated that by identical or nearly identical does not mean every pixel must have the same value as in most or many sensors there is a component of noise that will vary for each sample of a pixel. The inventive system and method anticipate that there will be a noise component to each sensor pixel and therefore to each pixel in any acquired frame. This pixel noise component is considered in determining whether there is any new information and changes assessed to be due to random noise variations are not considered as being new information. Another case where the inventive system and method may decide that there is no new or no useful biometric information for a given acquired frame is for example when a user touched a tiny portion of the sensor so that only a few frame pixels showed change. It will therefore be appreciated that frames need not actually be identical for a no new information assessment to be made and that various other criteria may be applied in choosing whether to accept and save an acquired frame or to discard it.

The determination as to whether there is any new information (Step 214) is advantageously performed after the determination of whether there is any fingerprint information (Step 213) if at all, as clearly there is no need to determine new information content (Step 214) if there is no information content (Step 213).

One embodiment of this type of any new information determination (Step 214) uses a measure of the cross-correlation between the last stored useful frame 224—saved in memory—and the current acquired frame 223 that is being tested to determine if there is any new information relative to the last useful frame. Some embodiments of the invention may compare all pixels in each frame 223; however, in other embodiments for efficiency purposes, all the pixels in each frame are not compared. Instead, the method compares one row of the current frame 223 to the same row of the last useful frame 224. It is of course possible, and sometimes advantageous, to use multiple rows at once, or compare more the one row, and other embodiments of the invention may provide for such multiple row comparisons. The number of rows selected may be selected on the basis of the change detection sensitivity desired. For example, selecting only one row places the entire burden of detecting a change and hence new information on that single row. If the row contains for example eight pixels, then one of these eight pixels must change for a change to be detected. Providing multiple rows for comparison spreads the burden such that if any one of that larger number of pixels changes, the frame will be assessed to contain new information or data not contained in the last useful frame 224.

According to one embodiment, a new frame information cross-correlation procedure 255 is defined as the cross-correlation ((Correlation(R,d)) of row R of the last useful frame (lastFrame[R,m]) 224 with row R of the current frame (curFrame[R,m−d]) 223 and is mathematically expressed as follows in an any new fingerprint information determination (Step 214) correlation equation or function 255:

$$\text{Correlation}(R, d) = \sum_{m=d+1}^{M-d} (lastFrame[R, m] \times curFrame[R, m-d]) \quad [8]$$

where d is referred to as the "lag" or "offset" 256. Again, optionally in this expression as well as optionally in other of the correlation, cross-correlation, normalized correlation, normalized cross correlations, and their mathematical and/or functional equivalents, scale factors and/or offsets may be included and may for example take on any values including a scale factor of 1.0 and an offset of 0.0. In the case of the expression for (Correlation(R,d), the equation including such scale factors and offsets takes the form:

$$\text{Correlation}(R, d) = \quad [9]$$
$$C5 \times \sum_{m=d+1}^{M-d} (lastFrame[R, m] \times curFrame[R, m-d]) + C6,$$

where d is lag and is related to the horizontal movement of pixel values in one frame with respect to the pixel values in the other frame, and C5 and C6 are constants representing a correlation scale factor and a correlation offset respectively.

The lag 256 is related to the horizontal movement or displacement of the data or pixel values in one frame with respect to the data or pixel values in another as a function of time, and can therefore be thought of as a velocity. Because the method is effectively checking for the lack of movement, d is equal to zero. (Workers having ordinary skill in the art will appreciate in light of the description provided here that the relationship and decision criteria may alternatively be reformulated to check for movement.)

The correlation equation or function 255 above is maximized if the data (pixel values) in each frame (the last stored frame 224 and the currently acquired frame 223) are identical. Therefore, the procedure checks for lack of movement by checking to determine if the correlation is greater than or equal to (or alternatively greater than) a movement detection correlation threshold value 256 as follows:

$$\text{Correlation}(R,0) \geq \text{Movement\_correlation\_threshold}. \quad [10]$$

It will be appreciated that a different magnitude relationship may be used in conjunction with the same or with a different movement correlation threshold value 256, and as stated, movement rather than lack of movement may be the basis for either the alternative magnitude expression and/or of the movement correlation threshold value.

While this cross-correlation procedure and function 225 may be used in conjunction with other aspects of the inventive system and method, another embodiment advantageously uses a modified version of the correlation procedure or function 255, and is referred to as movement detection Normalized Cross Correlation 258 for movement detection associated with the determination as to whether the newly acquired frame 223 contains any new fingerprint information as compared to the last saved useful frame. (See Ballard and Brown, *Computer Vision*, Prentice Hall, 1982, pp. 66–69 for a description of a version of Normalized Cross-Correlation; which is herein incorporated by reference.) Another normalized cross correlation 270 for correlation of a newly acquired frame 223 to reconstructed image 225 (Step 226) is subsequently described. Normalized Cross Correlation (NCC) may typically be better suited to movement detection for image registration tasks like fingerprint image generation of reconstruction or retinal eye image generation or reconstruction. Unlike standard correlation 255, the normalized cross-correlation 258 is invariant to changes in image pixel gray-level or intensity (which may for example result from changes in finger contact pressure, sensor drift, sensor automatic gain control (AGC) if provided, or other factors), and has a range (due to the normalization component) that is independent of the number of frame pixels used in the calculation, and is more accurate because it is less dependent on local properties of the image frames being correlated.

One expression for Movement Detection Normalized Cross Correlation (NCC) 278 is given below:

$$NCC(R, d) = \frac{\sum_{m=d+1}^{M-d} \{lastFrame[R, m] - \overline{lastFrame[R, d]}\} \times \{curFrame[R, m-d] - \overline{curFrame[R, d]}\}}{\sqrt{\sum_{m=d+1}^{M-d} \{lastFrame[R, m] - \overline{lastFrame[R, d]}\}^2 \sum_{m=d+1}^{M-d} \{curFrame[R, m-d] - \overline{curFrame[R, d]}\}^2}} \quad [11]$$

where: NCC(R,d) is the normalized cross-correlation of the row R of the last useful frame with row R of the current frame for a lag value of d, curFrame[R,m] is the gray-level value of the pixel at row R and column m of the current frame, lastFrame[R,m] is the gray-level value of the pixel at row R and column m of the last frame, $$\overline{lastFrame[R, d]} = \frac{\sum_{m=d+1}^{M-d} \{lastFrame[R, m]\}}{M - |d|}, \quad [12]$$

is the average of row R from column d+1 through column M−d, and $$\overline{curFrame[R, d]} = \frac{\sum_{m=|d|+1}^{M-|d|} \{curFrame[R, m]\}}{M - |d|}, \quad [13]$$

is the average of row R from column d+1 through column M−d, and |d| is the absolute value of d. Again, these expressions may include either or both of a multiplicative factor and an offset or bias. While the above equations describe an embodiment of the inventive procedure, it will be appreciated by those workers having ordinary skill in the art that the relationships may be stated in different mathematical terms or forms having the same mathematical equivalence, as well as by approximations of these mathematical equations.

One may alternatively describe the relationships in plain language terms without resort to the particular mathematical formulae. The Normalized Cross-Correlation NCC(R,d) at row R and a lag of d can be calculated, for the columns in row R, summing the following terms for each pixel in row R and then dividing by a normalization: the difference of each pixel in row R of the last frame to the average value of that row, the difference of each pixel in row R of the current frame to the average value of that row where the column is offset by d, and multiplying the two above terms. Once the sum is calculated, we divide by a normalization term (the denominator in the equation for NCC(R,d) ) so that the NCC ranges from 0 to 1. (Note however that these expressions including the expressions for NCC may be multiplied by a scale factor and/or offset by a bias value so that the NCC range may be altered from its nominal 0 to 1 range. )

Figure 9:
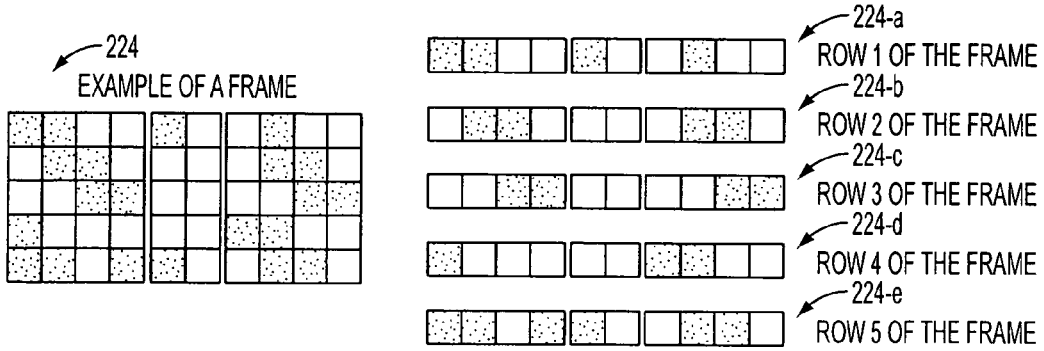
FIG. 9 is a diagrammatic illustration showing exemplary relationships between frames, patches, rows, and subsets and supersets of rows.
Figure 9:
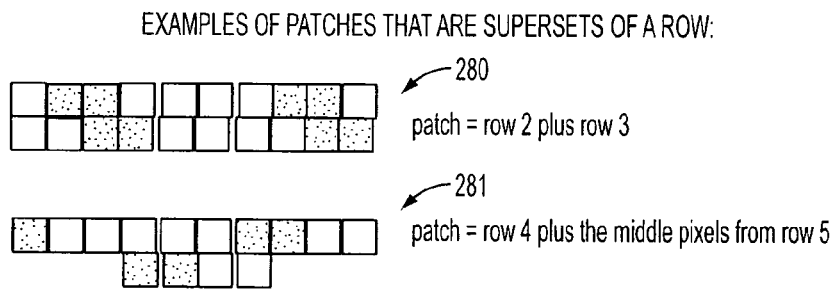
Figure 9:
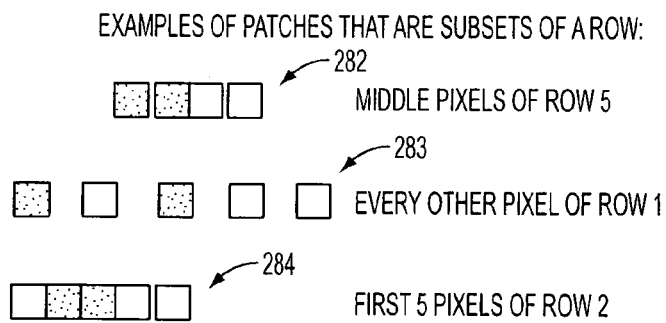

The above equations for NCC(R,d), current frame average $\overline{curFrame[R,d]}$, and last frame average $\overline{lastFrame[R,d]}$ are formulated in terms of rows (R) of each frame, but it is more general and equally valid when formulated as "patches" or regions of each frame, where a patch or region can be either some subset or some superset of a row. The nature and relationships between frames, patches, rows, and subsets and supersets of rows are illustrated in FIG. 9. While the patches of each frame to be correlated can be any arbitrary set of pixels, embodiment of the invention advantageously use the middle row of each frame. Any row or subset of a row could be chosen as well, but if the patch is too small the statistical significance of the cross-correlation value will erode. In this case R equals the middle row of each frame.

Once the normalized movement detection cross-correlation NCC 278 in the equation for NCC(R,d) is calculated, if NCC>Movement_NCC_threshold 279, the currently acquired frame 223 is deemed to have no movement relative to the last stored useful frame 224 and so the newly acquired frame 223 is therefore discarded or thrown away (Step 218). Since the normalized cross correlation is between zero and one (0≦NCC≦1), a typical value of Movement_NCC_threshold=0.95 in some embodiments. Other thresholds are possible depending on sensor characteristics, such as for example on how much random noise is inherent in the sensor device captured images. Typically, the more noise from the sensor 150, the lower the movement NCC threshold 279 needs to be to prevent throwing away useful frames. The less noise from the sensor, the higher the movement NCC threshold 279 can be and the more certain one can be that no useful frames are being thrown away.

Embodiment of Correlation of Acquired Frame to Reconstructed Image

Once an acquired frame 223 is analyzed, if it is thrown away (Step 215, 218), the procedure 201 optionally executes the optional procedural and program logic block (Step 219) that adjusts the sensor settings, but only if such adjustment appears necessary and only if the sensor supports that kind of adjustment. Determining whether may for example rely on additional analysis of the frame properties (Step 212) as already described. Sensor adjustments may optionally made when a frame is thrown away so that in the event some sensor mis-calibration or setting is responsible for a bad frame, the reason for the bad frame or frames may be corrected. Otherwise, if the currently corrected frame is kept and stored as the last useful frame (Step 205), the next step is to correlate (Step 226) the current frame to the partially reconstructed image. Note that when the procedure implemented by an executable computer program starts up, the first kept frame is simply copied to the partially reconstructed image buffer. This is somewhat arbitrary but there is a need to have a first frame before any correlation can occur, since there are no previous frames to correlate it to. However, once there is a partially reconstructed image 225, each kept frame 224 must be correlated to the partially reconstructed image 225 so that the reconstructed image 225 can be extended with the new information from the newly acquired frame. Once the reconstructed image has been updated (Step 207) it is stored in storage 232 which may for example be the random access memory (RAM) of any conventional type (fixed or removable) within the cell phone. Reconstructed image statistics 226 may optionally be collected (Step 214) and stored.

Embodiment of Correlation Formulas

Attention is now directed to a particular embodiment of a procedure for performing the frame matching correlation of the latest acquired useful frame to the partially reconstructed image. One embodiment of the inventive system, method, and computer program performs frame matching correlation or matching of the newly acquired frame to the generated or reconstructed image using normalized cross-correlation (NCC) 270. In one embodiment, the frame matching NCC 270 may be done using the same form of the equations as the movement detection (movement detection normalized cross-correlation 258) previously described, though other mathematical formulation may be implemented and other forms of normalized cross correlation may alternatively be used. Standard correlation may also be used in alternate embodiments, of course, by direct substitution.

The frame matching normalized cross correlation NCC (R,S,d) 270 of row R of the reconstructed image 225 to row S of the current frame 223 (or at this stage to the stored version of the current frame 224), for a lag of d, is given by the expression:

$$NCC(R, S, d) = \frac{\sum_{m=d+1}^{M-d} \{reconImage[R, m] - \overline{reconImage}[R, d]\} \times \{curFrame[S, m-d]) - \overline{curFrame}[S, d]\}}{\sqrt{\sum_{m=d+1}^{M-d} \{reconImage[R, m] - \overline{reconImage}[R, d]\}^2 \sum_{m=d+1}^{M-d} \{curFrame[S, m-d] - \overline{curFrame}[S, d]\}^2}} \quad [14]$$

Again, this expression may include either or both of a multiplicative factor and an offset or bias.

Since the lag, or offset, of the information in the current frame relative to the lag or offset in the partially reconstructed image is not known beforehand, we may typically need to calculate NCC(R,S,d) for multiple values of d to find the one value of d that corresponds to the best fit. Therefore, we use the relationship peak NCC(R,S,L) is equal to the maximum value of MAX{NCC(R,S,d)} over the range of d from −L to +L where L 271 is the lag value (typically measured in number of image columns), as follows:

PeakNCC(R,S,L)=MAX{NCC(R,S,d)} for d=−L to d=L. [15]

The peak value of d, otherwise referred to as $d_{pcak}$(R,S,L) 272 is then equal to the value of d at which the above equation for PeakNCC(R,S,L) is satisfied, that is:

$d_{peak}$(R,S,L)=the value of d at which the above equation is satisfied. [16]

In one embodiment, L=25 columns, but L should generally be chosen so that it is as large as the maximum x-velocity 273 that can occur from frame to frame. (Details of the x-velocity Δx(i) 273 and the y-velocity Δy(i) 274 are provided elsewhere in this description.) A smaller value of L is more computationally efficient, but may produce less accurate or inaccurate results if the finger shifts more than ±L from one from to the next.

In another embodiment, L is a function of the $d_{peak}$ from the last iteration i−1. For example, L(at iteration i)=$d_{peak}$ (at iteration i−1)+e, where e is an integer usually less than about 25. This is typically equal to 1 or 2 but is generally related to the maximum movement of the finger from one frame to the next and may take on values in the range 0 to 100, but the range is not limited to this particular value range.

Embodiment of Image Reconstruction Process

Figure 4:
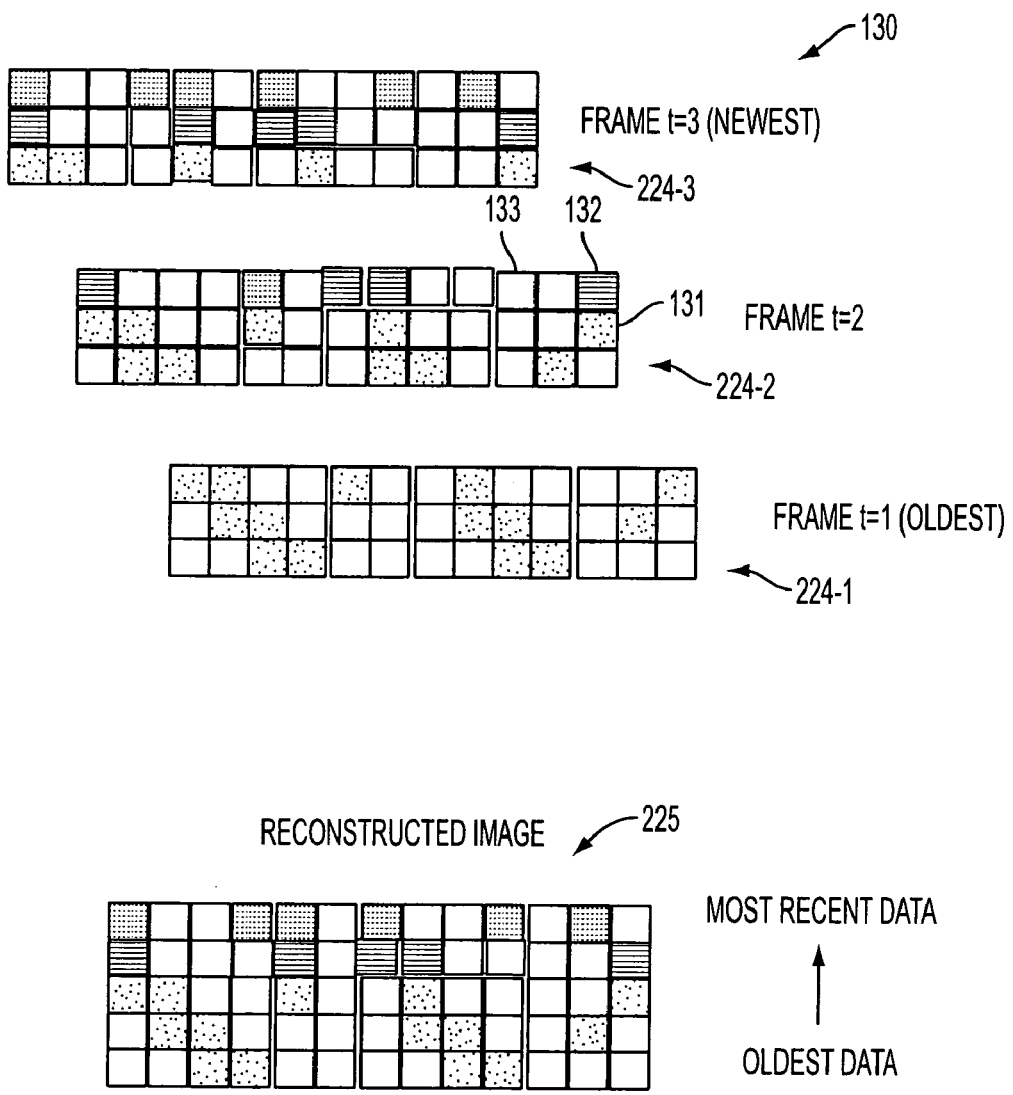
FIG. 4 is a diagrammatic illustration showing stages during the reconstruction of an image from individual frames according to an embodiment of the invention.

Using PeakNCC(R,S,L) 275 defined above in the equation for PeakNCC(R,S,L) above, reconstruction is then straightforward. The reconstructed image 225 at iteration i has rows numbered 1 through Height(i−1), as shown in FIG. 4, with row 1 containing the newest information from the most recent frame and row Height(i−1) containing information from the oldest frames (earlier iterations). Similarly, the current frame 223, 224 to be added to the reconstructed image 225 has rows 1 through N, where N is the number of rows supplied by the sensor.

For a given row S in the current frame 223, 224, we calculate PeakNCC and $d_{peak}$ as in the equation for PeakNCC(R,S,L) above with respect to rows 1 through N of the reconstructed image and take the $d_{peak}$ that corresponds to the maximum PeakNCC. In one embodiment, S=N, is advantageously selected so that we can be fairly sure, if the user is not swiping the finger too quickly, that row S of the reconstructed image will correlate and be a duplicate of one of the rows of the current frame. In computer program pseudo code, this procedure looks like that shown in Table 1.

TABLE 1

Exemplary Computer Program Pseudocode for an Image Reconstruction Procedure

START
Set L=25 ///// lag value fixed at 25 columns
Set S=N
Set bestMatchRow = 0
set MaxPeakNCC = 0 //// initialize max for each row
set $d_{peak}$Max = 0 /////initialize $d_{peak}$ for each row
Loop from reconRow = 1 through N { /////loop over first N rows of reconstructed image
    set x = PeakNCC(reconRow,S,L)
    if x > MaxPeakNCC
then {
set MaxPeakNCC = x /////keep largest
set $d_{peak}$Max = $d_{peak}$(reconRow,S,L)
set bestMatchRow = reconRow
    }
}
STOP Thus, after the above calculations, one has the following information for row S of the current frame 224:
  bestMatchRow 280, the row of the reconstructed image that results in the highest correlation value;
  MaxPeakNCC 281, the value of the correlation of the best matching row of the reconstructed image to the one in the current frame; and
  $d_{peak}$Max 282, the correlation lag where MaxPeakNCC 281 is reached.

Typically, a row of the new frame 224 will have a high correlation value to the row of the reconstructed image 225 where the data overlaps. Similarly, rows of the frame that contain new data not found in the reconstructed image will have low correlation values. Using the above information it is possible to calculate the x-velocity Δx(i) at iteration i and the y-velocity Δy(i) at iteration i for two different conditions.

First, if the maximum peak NCC (MaxPeakNCC) 281 is greater than the frame matching correlation threshold (corr_threshold) 283, or MaxPeakNCC>corr_threshold, then:
  Δx(i)=$d_{peak}$Max, which is the x-velocity at iteration i
  Δy(i)=N-bestMatchRow, which is the y-velocity at iteration i otherwise, (MaxPeakNCC≦corr_threshold):
  Δx(i)=Δx(i−1)
  Δy(i)=N Increment count of iterations where the correlation is below threshold where under either set of conditions, the frame matching correlation threshold corr_threshold is used to make sure the correlation is high enough to indicate an overlap of the current frame and the reconstructed image at all. We optionally increment the count by counting the number of iterations where the correlation is above threshold for optional use by other procedures.

In one embodiment the frame matching correlation threshold 283 is advantageously set to 0.75 (corr_threshold=0.75) but other values can be used to tune the algorithm's performance. Usually the correlation threshold will be between about 0.60 and 0.99, more typically between about 0.70 and 0.90. Other values that provide the desired performance may alternatively be used. In the case where the correlation is below the frame matching correlation threshold value, accurately determining the actual values for the x- and y-velocities ($\Delta x(i)$ and $\Delta y(i)$) may difficult or impossible, so the algorithm optionally uses estimates of these velocities instead. As shown above, the estimate for the x-velocity is simply to use the x-velocity from the last iteration ($\Delta x(i-1)$) instead of from the current iteration ($\Delta x(i)$), in other words the estimated $\Delta x(i)=\Delta x(i-1)$). The estimate for the y-velocity is chosen to be N. This is because we know, since there was no duplicate data in the current frame, the finger must have moved at least N rows since the last frame. Choosing the estimated y-velocity to be N works because doing so does not create any gaps in the image so that the image remains contiguous. Using a value larger than N is possible, but it will create gaps in the reconstructed image that could cause problems for algorithms that process the data. Even if the actual number of rows that the finger moved is greater than N, how much greater may not generally be known, so that values larger than N do not improve the reconstructed image in any way. Selecting values less than N, such as N−1, would not be advantageous but may represent a degenerate but operable performance in some circumstances.

This ability to estimate the x-velocities and y-velocities is an optional though important innovative part of embodiments of the invention, because it allows the inventive system, method, computer program, and algorithm to gracefully handle the case where the user swipes too quickly for consecutive frames to overlap.

By simply repeating the above calculations, it is possible to get this information for some or all of the rows in the current frame. In one embodiment, this is only done for row N as shown above, but other embodiments calculate it for other rows as well, and then verify that they all agree which rows of the frame correspond to which rows of the reconstructed image. If one uses multiple rows of the frame, then at iteration i, one has $\Delta x(i)$ and $\Delta y(i)$ for each frame row that is correlated. The final velocities used in the image reconstruction at this iteration are then calculated by taking the statistical mode, or most often or most frequently occurring value, of each above-threshold velocity, final$\Delta x(i)$ 284 and final $\Delta y(i)$ 285 as:

Final $\Delta x(i)$=MODE{set of all $\Delta x(i)$ where MaxPeakNCC>corr_threshold} [17]

Final $\Delta y(i)$=MODE{set of all $\Delta y(i)$ where MaxPeakNCC>corr_threshold} [18]

If there are no above-threshold velocities found, the estimates are used as shown above:

Final $\Delta x(i)=\Delta x(i-1)$ [19]

Final $\Delta y(i)$=N [20]

Increment count of iterations where the correlation is below threshold [21]

Regardless of which embodiment is used, once a final $\Delta x(i)$ 284 and final $\Delta y(i)$ 285 are found, it has been determined where the new frame 224 belongs with respect to the reconstructed image and can therefore update the reconstructed image by adding the new frame 224 to the previous partial reconstructed image 225 to obtain a new or replacement reconstructed image 225 that includes the additional frame.

Embodiment of Updating of Reconstructed Image and Statistics

Figure 5A:
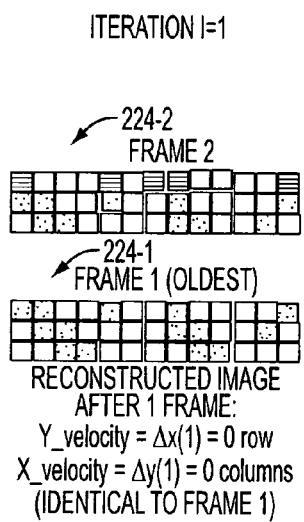
FIG. 5 is a diagrammatic illustration showing a detailed example of stages during different iterations of reconstruction according to an embodiment of the invention.
Figure 5B:
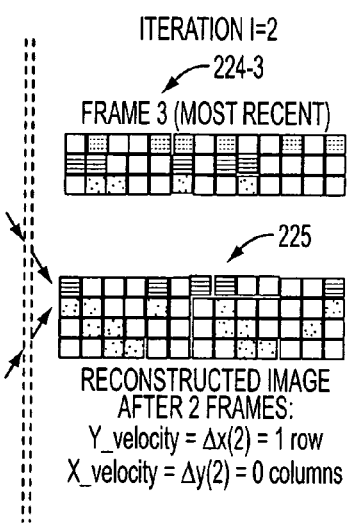
Figure 5C:
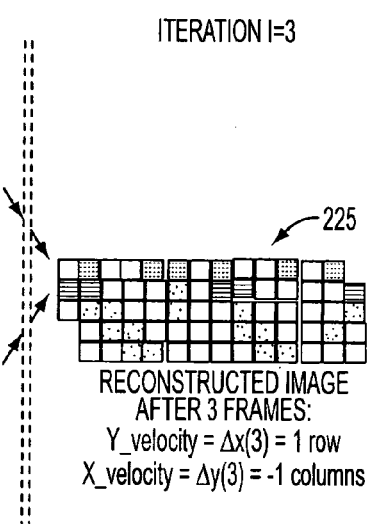

The frame matching correlation (Step 226) for the acquired frame to reconstructed image described above identifies exactly where the current frame overlaps the partially reconstructed image. Therefore, to update the reconstructed image 225, it is only necessary to align the new frame 224 to the reconstructed image 225 and copy (or concatenate ) it to the reconstructed image, as illustrated in FIG. 5, where FIG. 5*a*, FIG. 5*b*, and FIG. 5*c* show aspects of iterations for i=1, 2, 3 of the reconstructed image generation and the relationships of the added frames. If the frame contains any new information (i.e. $\Delta y(i)>0$) then this process will result in a taller image. If the frame does not contain any new information (for example, when $\Delta y(i) \leq 0$) then that (non-new-information-containing) frame will not be added or concatenated in register with the reconstructed or generated image and so the process will not result in a taller image.

In one embodiment, the following reconstructed image statistics 226 are optionally stored and updated each time a new frame 224 is added. It will be appreciated that as all of these reconstructed image statistics are optional, none or any one or combination of these statistics may be computed or collected and stored:

$\Delta x(i)$ and $\Delta y(i)$, the final x and y offsets or velocities 284, 285 of the current $i^{th}$ frame relative to the reconstructed image;

Height(i)=Height(i−1)+$\Delta y(i)$, the reconstructed image height 286, equal to the new total number of rows in the partially reconstructed image;

i=total_frames_used 287 is equal to the total number of iterations is equal to the total frames used thus far in the reconstruction;

The count of the number of iterations 288 where the MaxPeakNCC correlation is below threshold;

The number of consecutive frames discarded due to noise 289; and

The number of consecutive frames discarded due to no finger on sensor 290.

Computing or collecting these statistics (Step 214) is advantageous because it can be used to stop the frame acquisition process and also to calculate information about the speed and angle of the swipe.

As described above, the sensor settings or parameters may optionally be adjusted (Step 219) after a decision to throw away or discard a frame has been made 215, 218 if the sensor or device provide for such adjustment. The sensor settings or parameters may also optionally be adjusted (Step 219) after the update to the reconstructed image (Step 207) as well though usually this will only occur when images seem to be too dark or too light for most normal fingers (that is, the frame average is outside of a certain preset range and sensor adjustments will bring it into range again.) Note that the NCC is very tolerant of intensity changes so that in general parameters can vary over quite a range without being problematic.

Embodiment of Decision Criteria to Stop Frame Acquisition

At each iteration during the new frame 223 acquisition process, the inventive system, method, computer program and algorithm must determine whether to stop acquiring data (frames) from the sensor, that is, it must decide when the biometric reconstruction is complete and the finger swipe process by the user has terminated, so that the process can stop iterating. This is referred to as the stopping criteria and procedure (Step 208) for terminating the process. In this step of determining if it is time to stop acquiring additional sensor image frames 208 various alternative techniques may be employed as the stopping criteria or rule.

One embodiment of the inventive method and algorithm uses the following set of frame based stopping criteria to terminate the frame acquisition process, where the frame acquisition and image generation or reconstruction is stopped if:

(i) More than some number F of consecutive frames discarded due to noise (suggesting that there is no finger or other biometric present at the sensor), or (ii) More than some number G of consecutive frames have been discarded due to non-movement of the finger (or for a more generalized biometric—now new information in some number of consecutive frames), or (iii) More than some number K of total frames have already been acquired (suggesting that the finger or other biometric should have been captured based on assumptions of one or more of biometric size, biometric movement or scan speed, and sensor frame rate).

Here F, G, and K are some predetermined numbers (or dynamically determined numbers) or set of numbers. If any of the above three criteria are met, the inventive method, computer program, and algorithm ends the acquisition phase of the process, otherwise the process iterates again to acquire the next image frame from the sensor 204. Typically, F, G and K depend on the number of frames per second (frame rate) that the sensor and host computer are capable of providing to the reconstruction algorithm. In one embodiment, this speed is calculated and saved during the sensor initialization and calibration step described above. In one embodiment, these values are calculated as follows:

$$F=30\times\text{frames\_per\_second}/1000,  \quad [22]$$

$$G=100\times\text{frames\_per\_second}/1000, \text{ and} \quad [23]$$

$$K=3000\times\text{frames\_per\_second}/1000. \quad [24]$$

Advantageously, the use of frame rate (frames_per_second) in the inventive method and in the above equations ensures that systems with slower frame rates will behave similarly to systems with faster ones, since F, G and K are normalized to units of time. As an example, that means on a system with a frame rate of 500 fps, G=50 and the time it takes to achieve G frames is 50/500=0.1 seconds. On a system with a frame rate of 1000 fps, G=100 and the time it takes to achieve G frames is 100/1000=0.1 seconds, the same as in the slower system. It will be appreciated that these F, G, and K values may vary over a broad range according to many factors, including for example the characteristics of the sensor, the device carrying the sensor, the system and the user interface projected to the user.

This ability to compensate for slower and faster systems is an important innovation because the inventive system, method, computer program, and algorithm will perform much the same way across many systems, so that such differences will not be readily apparent to the person using the system. This also means that the invention may be adapted to use with many different sensors and devices.

Alternative embodiments may have different or more elaborate criteria for stopping, for example, they may use logical combinations of the individual criteria above, or apply additional or different metrics.

Embodiment of Procedure for Calculating Post-reconstruction Statistics

Once the relevant portion of the image is fully reconstructed, the inventive system and method optionally but advantageously calculates additional statistics (Step 220) for possible use by other, separate procedures or software modules. For example, the final height 291, angle of swipe 292, and speed of swipe 293 may be determined and stored as follows:

Final height of the reconstructed image=Height(i)=H

Angle of swipe=arctan[ $H/\Sigma\{\Delta x(i)\}$ ], where the sum or all of the x-velocities ($\Sigma\{\Delta x(i)\}$) is the sum of the $\Delta x(i)$ over all iterations where $\Delta y(i)>0$;

Speed of swipe=average number of new rows added per frame=[$\Sigma\{\Delta y(i)\}$/total_frames_used]

The angle of swipe (or swipe angle) 292 and the speed of the swipe (or swipe speed or swipe velocity) 293 may be useful to other procedures and software modules for different reasons. For example, the speed of the swipe 293 is useful to let a user of the device incorporating the sensor and algorithm know if he or she is swiping too quickly, and to inform him or her to slow down. This information may be in the manner of a message to the user generated by the cell phone 150 or other device. The angle of the swipe 292 is especially useful to the fingerprint matching computer software and procedure. For example, if a user enrolls his or her fingerprint image by swiping at a vertical enrollment angle (e.g. 0 degrees), but he or she tries to verify by swiping at a 45 degree (or some other angle different from the enrollment angle), this may be problematic for the matcher, as many matchers have limits to the acceptable rotation of an enrolled fingerprint image to the verified one. But if the matcher has information about the angle of the swipe 292 for the enrolled and verified image, then the matcher or matching procedure can compensate for the relative rotation of one image (enrollment biometric image) to the other image (biometric image reconstructed during use) and hence either be more efficient and/or have higher accuracy as a result, or both. Alternative embodiments could add additional statistics as would benefit the system and its operation.

Embodiment of Procedure for Embedding Information into the Reconstructed Image

There is a number of statistics and other information that may be useful to downstream fingerprint image processing procedures and computer program software. This may be provided and formatted as a file or message header, such as by placing it into the reconstructed image (Step 221), or by other means. It is optional but advantageous to incorporate these statistics or other information when provided in the reconstructed imaged (whether in a header or otherwise provided or encoded in the image so that it is only necessary to communicate and track one file or other reconstructed image transport token and so that this file or transport token is self-contained.

The statistics and information that are calculated and made available to other separate software modules according to one embodiment are listed in the Table 2, all or any one or combination of these statistics and information are optional and need not be collected or utilized in one or other embodiments of the invention. It will be apparent that the number of bits or bytes allocated to carry the statistics or information may be determined on the basis of different encoding schemes and that various encoding schemes as are known in the art may be employed.

TABLE 2

Exemplary Optional Biometric Image File Statistics and Information

| Data field | Size in Bytes | Description and Value |
|---|---|---|
| Unique Identifier | 4 | The character string "SWIP" comprised of the 4 ASCII characters S, W, I and P so that it is easy to detect the presence of this information block |
| Version | 1 | Version of this header, Equal to 1 in one embodiment |
| Sensor vendor | 1 | Manufacturer of the fingerprint sensor (if known) |
| Sensor model | 1 | Specific model number of sensor (if known) |
| Sensor type | 1 | Sensing method used: capacitive, optical, infrared, pressure, etc. (if known) |
| Reconstructed Image Height | 2 | H, the number of rows in the reconstructed image |
| Reconstructed Image Width | 2 | W, the number of columns in the reconstructed image |
| Angle of swipe | 1 | Angle of swipe = $\arctan[H/\Sigma\{\Delta x(i)\}]$, where H is the total number of rows of the reconstructed image and $\Sigma \{\Delta x(i)\}$ is the sum of the $\Delta x(i)$ over all rows |
| List of $\Delta x$ | 2 × H | The $\Delta x(i)$ at each row i of the reconstructed image |
| Swipe Speed | 1 | Average number of new rows added per frame, = $\Sigma\{\Delta y(i)\}$/total_frames_used |
| Bad Corr. Count | 2 | The count of the number of iterations where the MaxPeakNCC was below threshold |

Additional information may optionally be added to this biometric image file header or to the other storage mechanism within the biometric image, including information about the type of computer used, time and date information, and Cyclic Redundancy Check (CRC) codes or other codes or indicia to verify integrity of the data. Optionally, fewer data fields can be included.

Once all the data is available and formatted, it is simply added to the reconstructed image. It can be added in many different ways, but in the preferred embodiment, the first few rows of the reconstructed image are simply overwritten with this information. Alternate embodiments could make this information available in a separate section of memory instead of the reconstructed image, or simply not available at all.

This embodiment of the frame acquisition and image reconstruction procedure 201 is now summarized so that the flow of the procedure illustrated in FIG. 3 may be appreciated without the expansive details of each step. The frame acquisition and image reconstruction procedure begins (Step 203) in response to some initializing event such as a command or instruction from computer program software 153 executing on the device 150 carrying and coupled for data and command communication with the sensor. Next, the sensor or its associated electronics are optionally initialized (Step 210) and optionally adjusted (Step 211). The next frame 223 (or the first frame where it is the first iteration) is acquired from the sensor (Step 204) and acquired frame properties are optionally estimated (Step 212). An acquired frame keep/discard determination is optionally made (Step 215) and the acquired frame is kept (Step 217) or discarded (Step 218) according to that determination.

If the acquired frame is kept, it is stored as the last useful frame (Step 205) in a memory storage 230 and becomes the stored frame 224. Information from the stored frame 224 may optionally be retrieved to be used in estimating frame properties including for example in determining if a newly acquired frame has any new information as compared to the previous stored useful frame.

The stored frame 224 is then compared (Step 226) using a comparison technique or procedure such as by using a correlation procedure 270 to determine identify the relationship between the acquired frame and the reconstructed composite image 225 that is being generated. The reconstructed image 225 and optionally reconstructed image statistics 226 as well as the store frame 224 are retrieved from memory for use in the comparison procedure.

Once the usefulness and relationship have been determined by the comparison (Step 226) the composite reconstructed image is updated (Step 207) with the additional information which usually results in a lengthening or growth in the reconstructed image 225 and optionally the reconstructed image statistics are also updated (Step 214) and stored back in memory either for use with the final reconstructed image if the last iteration, or for used during subsequent iterations.

The sensor settings may optionally be adjusted (Step 219) after the reconstructed image is updated (Step 207) as well as if the last acquired frame was discarded and not used for reconstruction, prior to the acquisition of the next frame (if additional frames are to be acquired).

Next, a determination is made as to whether it is time to stop acquiring frames (Step 208) according to some stop criteria or rules. If additional frames are to be acquired, then the procedure is repeated or iterated from the step of acquiring the next image frame (Step 204) from the sensor through the update to reconstructed image (Step 207) until it is time to stop acquiring frames.

Optionally, post reconstruction statistics or other information are calculated or otherwise determined (Step 220) by retrieving reconstructed image 225 and/or reconstructed image statistics 226 from memory storage 232. These post-reconstruction statistics or other information items are then stored in association with the reconstructed image. In one embodiment this storage is by a separate file or data structure; however, advantageously, the yare stored within the reconstructed images, such as by writing them to a header record having a plurality of fields for storing the statistics or other information, or by other encoding scheme.

Once these steps have been completed, the procedure stops (Step 209) and the reconstructed image 225 and any post-reconstruction statistics or other information are available for other use, such as fingerprint matching, minutiae extraction, or other biometric information usage.

Other Alternative Embodiments

Figure 6:
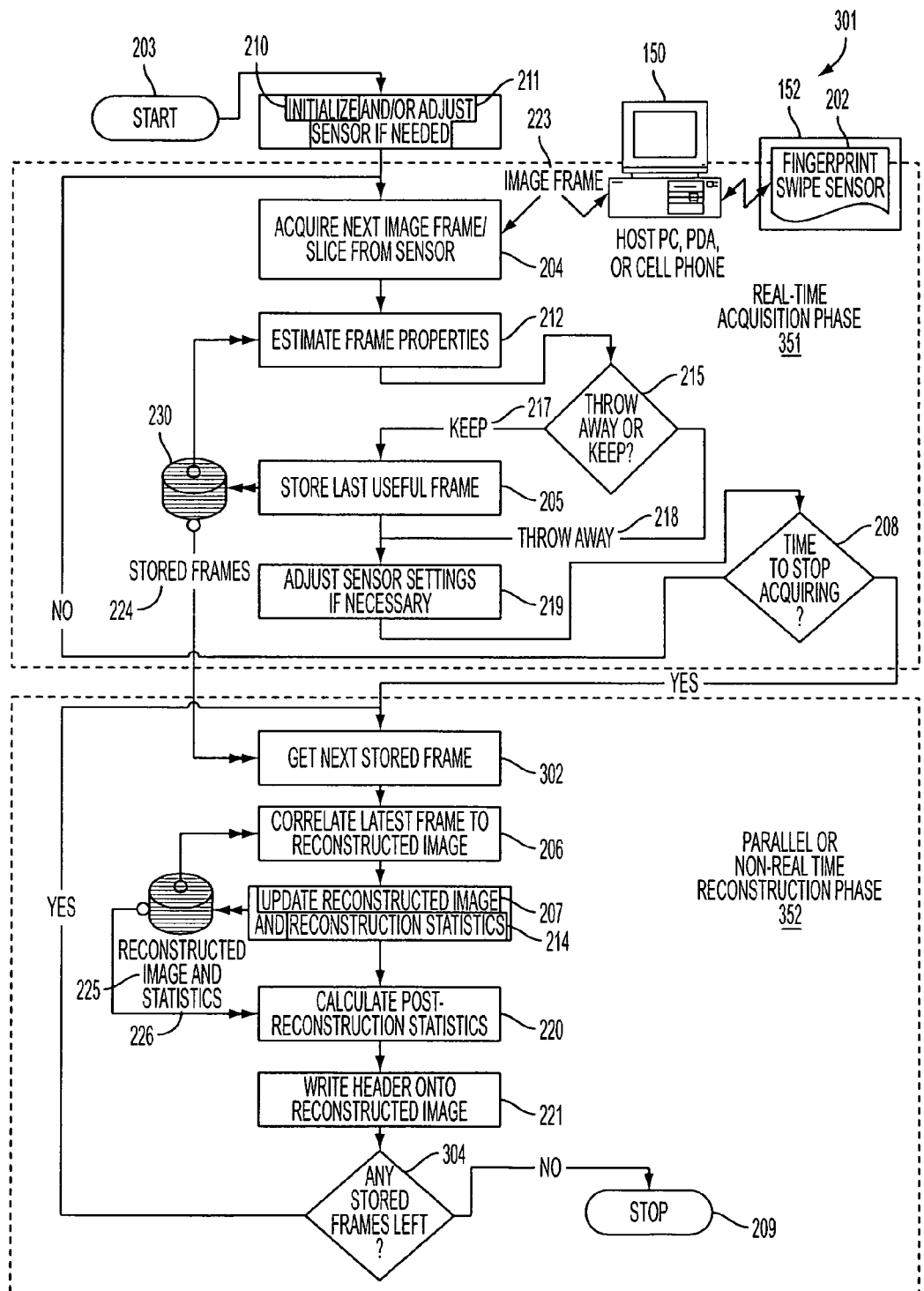
FIG. 6 is a diagrammatic illustration showing a flowchart of an embodiment of a frame acquisition and image generation or reconstruction procedure using separate acquisition and reconstruction.

Various alternative embodiments of the system, method, computer program, and algorithm may be provided. In the next several paragraphs are described additional alternative embodiments of the invention, including but not limited to: (i) an embodiment for a non-real-time implementation in which the frame acquisition and image reconstruction procedures are separate (See FIG. 6), (ii) an embodiment in which several optional elements of the real-time acquisition and reconstruction procedure of the embodiment of FIG. 3 are eliminated (See FIG. 7); and an embodiment in which several optional elements of the separate non-real-time acquisition and reconstruction procedure of the embodiment of FIG. 6 are eliminated (See FIG. 8).

Embodiment of Non-Real Time Implementation

In one alternative embodiment, the frame acquisition and image reconstruction phases or procedures may be performed separately and in other than real-time. The frame acquisition phase is performed in real time and the frames are stored so that they may be analyzed and the fingerprint or other biometric image generated and reconstructed from frames pulled from memory storage rather than from the sensor directly. The image reconstruction may alternatively be performed in parallel with the frame acquisition and still pull acquired frames from the memory storage only this reconstruction need not occur as each frame is acquired or at the same rate. Normally the image generation or reconstruction will complete some time after the last frame has been acquired. It will therefore be appreciated that it is possible to do acquisition and reconstruction in separate processes, but concurrently rather than in series as we discuss in greater detail below. In such parallel processing, the acquisition process collects and stores the frames while the reconstruction process in parallel reconstructs using the stored frames. This is advantageous because the reconstruction process can keep the number of stored frames lower than if it were done in series or sequentially, since it will be continually processing the old stored frames and can therefore reuse that memory storage buffer for new frames. That is, the frame storage buffer is being both added to (by acquisition) and subtracted from (by reconstruction). If reconstruction runs at the same rate as acquisition, the buffer would not grow at all; if the reconstruction ran faster than acquisition it would be real-time; if the reconstruction were half as fast as acquisition then the buffer would need to be only half as big as is necessary if we do it in series.

It will be appreciated that embodiments of the invention described herein perform frame acquisition and image reconstruction in real-time, that is they perform the frame acquisition and image reconstruction without any perceptible delay in processing so that the frames are processed as or substantially as they are collected and the user is unaware of any delay associated with post fingertip swipe processing. Alternative embodiments of the inventive system, method, computer program, and algorithm may be non-real-time and involve storage and post acquisition processing.

For example, an alternate embodiment is illustrated in the flowchart diagram in FIG. 6, where the image frames are first acquired and stored, then reconstructed later after all the image frames are received. This embodiment is the same in every other way to that of the real-time embodiment described above relative to FIG. 3 and the image reconstruction diagrams of FIG. 4 and FIG. 5, but has the advantage of being useful when sufficient computing power or computing speed does not exist to acquire each frame 223 and correlate each acquired useful frame 223, 224 in with the partially reconstructed image 225 in real time or otherwise as each new frame is acquired from the sensor. Where sufficient computing power or speed does not exist, consecutive frames which may be delayed due to the need to process and correlate the earlier acquired frame would or may not overlap in this case and the reconstructed image would likely have many errors in it. Therefore, during the acquisition phase, the acquired frames are simply stored in memory store such as a random access memory, buffer memory, or by other memory storage means as are known in the art for later use and processing after the user has finished swiping his finger across the sensor and sufficient number of frames have been acquired to generate or reconstruct the fingerprint or other biometric. Since the storage process is very fast, the acquisition process will be able to keep up with the fast rate of the finger swipe.

This embodiment of the frame acquisition and image reconstruction procedure 301 is now summarized so that the flow of the procedure illustrated in FIG. 6 may be appreciated without the expansive details of each step which have already been described relative to the embodiment of FIG. 3.

The frame acquisition and image reconstruction procedure begins (Step 203) in response to some initializing event such as a command or instruction from computer program software 153 executing on the device 150 carrying and coupled for data and command communication with the sensor. Next, the sensor or its associated electronics are optionally initialized (Step 210) and optionally adjusted (Step 211). The next frame 223 (or the first frame where it is the first iteration) is acquired from the sensor (Step 204) and acquired frame properties are optionally estimated (Step 212). An acquired frame keep/discard determination is optionally made (Step 215) and the acquired frame is kept (Step 217) or discarded (Step 218) according to that determination.

If the acquired frame is kept, it is stored as the last useful frame (Step 205) in a memory storage 230 and becomes the stored frame 224. Information from the stored frame 224 may optionally be retrieved to be used in estimating frame properties including for example in determining if a newly acquired frame has any new information as compared to the previous stored useful frame.

At this point procedure 301 deviates from the afore described procedure 201, in that the comparison such as correlation (Step 226), update reconstructed image (Step 207) and any optional image reconstruction statistics update (Step 214), are delayed until additional frames are acquired. Normally, this means a delay until all additional frames are acquired, but in one embodiment, the comparison or correlation (Step 226) and update reconstructed image (Step 207) may processed separately on another processor or different procedure not tied in time to the frame acquisition. Clearly, the frame acquisition procedure and image generation or reconstruction procedures may be used separately or combined.

The sensor settings may optionally be adjusted (Step 219) after each of the plurality of acquired frames are stored (Step 205) as well as if the last acquired frame was discarded and not stored (Step 215), prior to the acquisition of the next frame (if additional frames are to be acquired).

Next, a determination is made as to whether it is time to stop acquiring frames (Step 208) according to some stop criteria or rules. If additional frames are to be acquired, then the procedure is repeated or iterated from the step of acquiring the next image frame (Step 204) from the sensor through the optional adjustment of sensor settings (Step 219) until it is time to stop acquiring frames.

At the end of this procedure, all of the useful acquired frames are stored in memory storage, such as in a random access memory. In the event that usefulness of individual frames cannot be determined in real time, then all acquired frames may be stored and the useful from non-useful determination made in a post-acquisition processing procedure before or in conjunction with the comparison or correlation procedure and/or image reconstruction procedure.

The separate non-real-time or delayed composite biometric image reconstruction procedure operates substantially like the real-time procedure except that frames are retrieved from memory rather than from the sensor. It will be appreciated that embodiment of the real-time procedure may actually write sensor data to a buffer or other memory, but in the real time embodiment, such stored sensor data is then retrieved into the comparison and reconstruction procedures before the next frame is acquired.

The plurality of stored frames 224 are retrieved (Step 302) from storage 230 and is then compared (Step 226) using a comparison technique or procedure such as by using a correlation procedure (Step 270) to determine or identify the relationship between the acquired frame and the reconstructed composite image 225 that is being generated. The reconstructed image 225 and optionally reconstructed image statistics 226 as well as the store frame 224 being compared are retrieved from memory for use in the comparison procedure.

Once the usefulness and relationship have been determined by the comparison (Step 226) the composite reconstructed image is updated (Step 207) with the additional information which usually results in a lengthening or growth in the reconstructed image 225 and optionally the reconstructed image statistics are also updated (Step 214) and stored back in memory either for use with the final reconstructed image if the last iteration, or for use during subsequent iterations. Where determination of usefulness could not be made during acquisition, either because of insufficient processing capability, insufficient information as to the content or characteristics of preceding or earlier frames or frame properties, or for other reasons, such usefulness determinations may be made prior to or within the comparison procedure (Step 226).

As before, optionally, post reconstruction statistics or other information are calculated or otherwise determined (Step 220) by retrieving reconstructed image 225 and/or reconstructed image statistics 226 from memory storage 232. These post-reconstruction statistics or other information items are then stored in association with the reconstructed image. Note that in this embodiment as well as in the previous embodiments, memory store 230 and memory store 232 may be the same or different physical memories. In one embodiment this storage is by a separate file or data structure; however, advantageously, they are stored within the reconstructed images, such as by writing them to a header record having a plurality of fields for storing the statistics or other information, or by other encoding scheme.

One additional step is required that iterates on the image comparison (Step 226) and image reconstruction (Step 207) procedures as well as optional procedures (Steps 214, 220, 221) (when present) so that all stored frames are considered in the comparison and reconstruction. This determination as to whether any stored frames remain to be processed (Step 304) is analogous to the determination made as to whether any additional frames should be acquired from the sensor (Step 208) already described.

Once these steps have been completed, the procedure stops (Step 209) and the reconstructed image 225 and any post-reconstruction statistics or other information are available for other use, such as fingerprint matching, minutiae extraction, or other biometric information usage.

Alternative Embodiment of Real-Time Reconstruction Procedure

Figure 7:
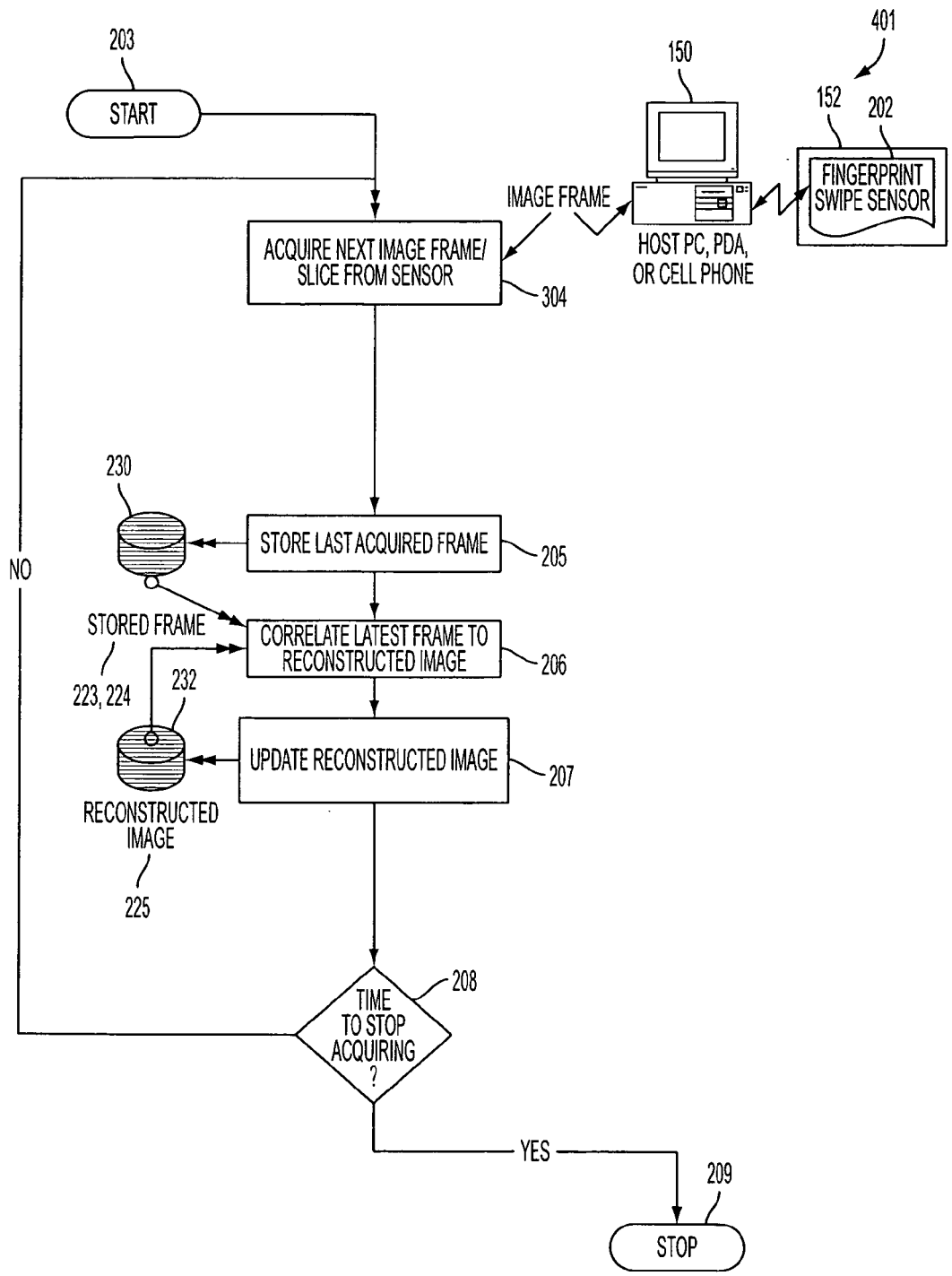
FIG. 7 is a diagrammatic illustration showing a flowchart of an alternative embodiment of a frame acquisition and image generation or reconstruction procedure.

With reference to FIG. 7 there is illustrated an alternative embodiment of a real-time or on the fly reconstruction procedure where some optional features of the embodiment illustrated in and described relative to the flowchart in FIG. 3 have been eliminated.

This embodiment of the frame acquisition and image reconstruction procedure 401 is now summarized so that the flow of the procedure illustrated in FIG. 7 may be appreciated without the expansive details of each step. The frame acquisition and image reconstruction procedure begins (Step 203) in response to some initializing event such as a command or instruction from computer program software 153 executing on the device 150 carrying and coupled for data and command communication with the sensor. The next frame 223 (or the first frame where it is the first iteration) is acquired from the sensor (Step 204) and it is stored as the last useful frame (Step 205) in a memory storage 230 and becomes the stored frame 224. Note that is no determination is made in this embodiment as to whether a frame is useful, the last acquired frame 223 is assumed to be useful and is stored as the last useful acquired frame 224.

The last acquired frame 224 is then compared (Step 226) using a comparison technique or procedure such as by using a correlation procedure 270 to determine identify the relationship between the acquired frame and the reconstructed composite image 225 that is being generated. The reconstructed image 225 is retrieved from memory for use in the comparison procedure.

The composite reconstructed image is then updated (Step 207) with the additional information and stored back in memory either for use with the final reconstructed image if the last iteration, or for used during subsequent iterations of the procedure.

Next, a determination is made as to whether it is time to stop acquiring frames (Step 208) according to some stop criteria or rules. If additional frames are to be acquired, then the procedure is repeated or iterated from the step of acquiring the next image frame (Step 204) from the sensor through the update to reconstructed image (Step 207) until it is time to stop acquiring frames.

Once these steps have been completed, the procedure stops (Step 209) and the reconstructed image 225 and any post-reconstruction statistics or other information are available for other use, such as fingerprint matching, minutiae extraction, or other biometric information usage.

It will be appreciated that this embodiment of the acquisition and reconstruction procedure 201 eliminates many steps that were described relative to the embodiment of the procedure 201 of FIG. 3. Any one, selected combination, or all of the eliminated steps may be provided with this embodiment of procedure 401 to enhance performance and provide the advantageous features provided by the optional steps.

Figure 8:
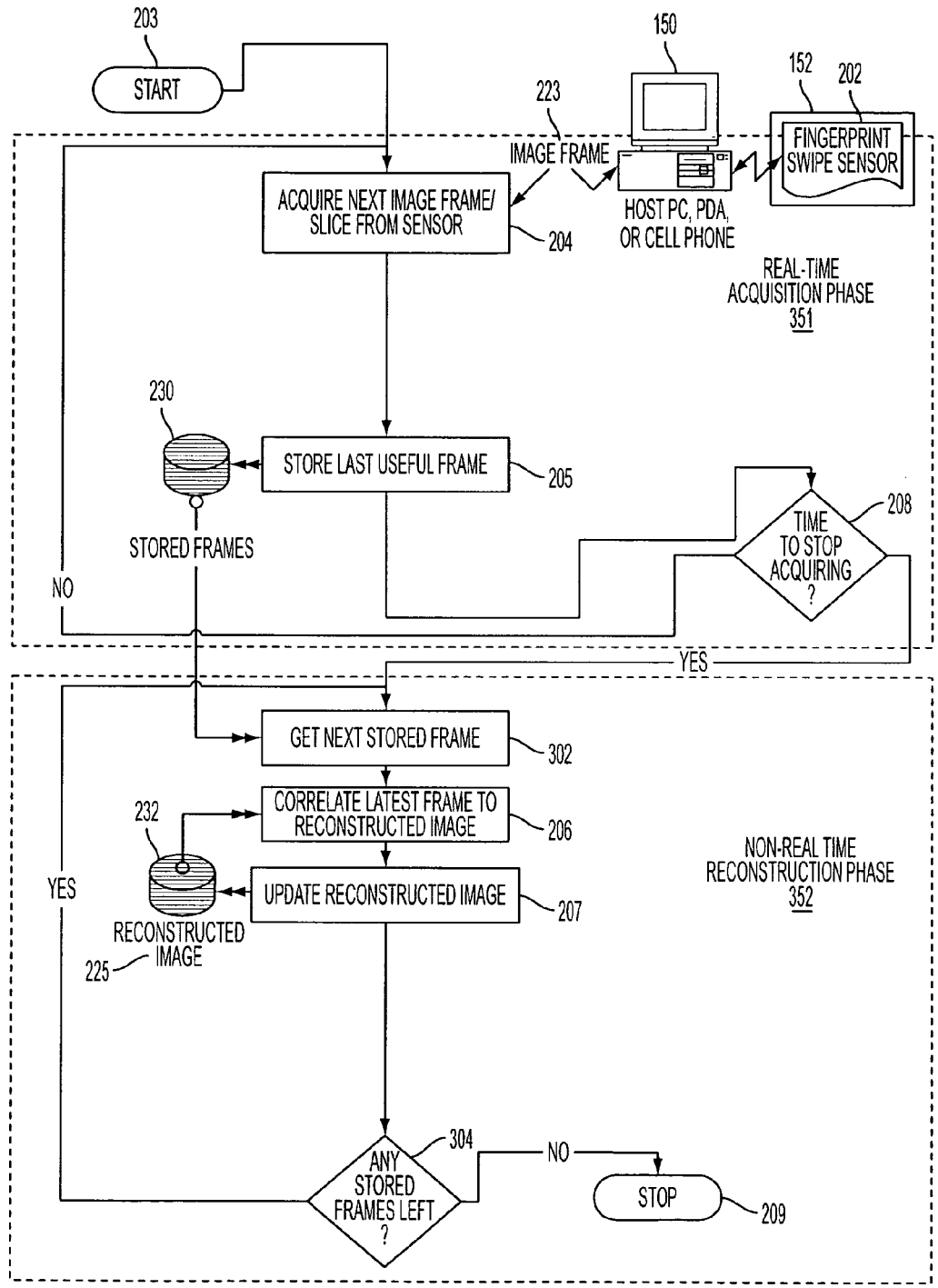
FIG. 8 is a diagrammatic illustration showing a flowchart of a different alternative embodiment of a frame acquisition and image generation or reconstruction procedure.

Alternative Embodiment of Reconstruction Procedure Using Separate Acquisition and Reconstruction With reference to FIG. 8 there is illustrated an alternative embodiment of a real-time acquisition phase but non-real-time or stored frame reconstruction phase procedure where some optional features of the embodiment illustrated in and described relative to the flowchart in FIG. 6 have been eliminated.

For example, an alternate embodiment is illustrated in the flowchart diagram in FIG. 8 that is somewhat analogous to the embodiment shown and described relative to the embodiment in FIG. 6, where the image frames are first acquired and stored, then reconstructed later after all the image frames are received. As for the embodiment of FIG. 6, it has the advantage of being useful when sufficient computing power or computing speed does not exist to acquire each frame 223 and correlate each acquired useful frame 223, 224 in with the partially reconstructed image 225 in real time or otherwise as each new frame is acquired from the sensor. Moreover, as many optional steps and procedures have been eliminated, this embodiment is capable of being used with even less capable or slower processors.

This embodiment of the frame acquisition and image reconstruction procedure 501 is now summarized so that the flow of the procedure illustrated in FIG. 8 may be appreciated without the expansive details of each step that have already been described relative to the embodiments of FIG. 3 and FIG. 6.

The frame acquisition and image reconstruction procedure begins (Step 203) in response to some initializing event such as a command or instruction from computer program software 153 executing on the device 150 carrying and coupled for data and command communication with the sensor. The next frame 223 (or the first frame where it is the first iteration) is acquired from the sensor (Step 204). All acquired frames are kept and stored as the last useful frame (Step 205) in a memory storage 230 and becomes the stored frame 224.

Next, a determination is made as to whether it is time to stop acquiring frames (Step 208) according to some stop criteria or rules. If additional frames are to be acquired, then the procedure is repeated or iterated from the step of acquiring the next image frame (Step 204) from the sensor and storing the frames (Step 205).

At the end of this procedure, all of the useful acquired frames are stored in memory storage 230, such as in a random access memory.

The separate non-real-time or delayed composite biometric image reconstruction procedure operates substantially like the real-time procedure except that frames are retrieved from memory rather than from the sensor.

The plurality of stored frames 224 are retrieved (Step 302) from storage 230 and is then compared (Step 226) using a comparison technique or procedure such as by using a correlation procedure 270 to determine identify the relationship between the acquired frame and the reconstructed composite image 225 that is being generated. The reconstructed image 225 is retrieved from memory for use in the comparison procedure along with the retrieved stored frame.

The composite reconstructed image is updated (Step 207) and stored as the currently reconstructed image back in memory either for use with the final reconstructed image if the last iteration, or for used during subsequent iterations.

A determination is then made as to whether any stored frames remain to be processed (Step 304). Once these steps have been completed, the procedure stops (Step 209) and the reconstructed image 225 and any post-reconstruction statistics or other information are available for other use, such as fingerprint matching, minutiae extraction, or other biometric information usage.

It will be appreciated that this embodiment of the acquisition and reconstruction procedure 501 eliminates many steps which were described relative to the embodiment of the procedure 301 of FIG. 6. Any one, selected combination, or all of the eliminated steps may be provided with this embodiment of procedure 501 to enhance performance and provide the advantageous features provided by the optional steps.

Alternative Embodiment of x-Velocity and y-Velocity Values

With respect to the correlation functional block (Step 226) in the afore described embodiments of procedures 201, 301, 401, and 501 and sub-procedures therein, it will be appreciated in light of the description provided here that it is important to compare, such as by using correlation or cross-correlation, and determine the x- and y-velocities $\Delta x(i)$ and $\Delta y(i)$ as described. It should also be appreciated that it is optional to provide values for $\Delta x(i)$ and $\Delta y(i)$ in the case of below-threshold correlation values. One may merely generate an error and leave a blank row or blank rows in the reconstructed image. It may not provide the degree of visual satisfaction but would still provide a reconstructed image so long as the number of blank or filled rows was not excessive. In another alternative, one would provide some values, however arbitrary, for $\Delta x(i)$ and $\Delta y(i)$ so the reconstructed image would look good or better than with blank row fill. And, while the afore described more accurate estimate of $\Delta x(i)$ and $\Delta y(i)$ are advantageously provided, another alternative approach is to set $\Delta x(i)=0$ and $\Delta y(i)=N$ instead of using the last $\Delta x(i-1)$ value.

In another alternative embodiment, the stopping criteria may also be simplified and one or more of the stopping criteria described relative to the embodiments in FIG. 3, FIG. 6, FIG. 7, and/or FIG. 8, may be modified or eliminated.

It is important to provide some sort of stopping criterion but not necessarily an elaborate one. The alternative embodiments eliminate the "frame properties" functional block in favor of a more simple stopping criterion or procedure. For example, the stopping criteria may be (a) stop after more than Z frames acquired where Z is some fixed predetermined or variable dynamically determined number such as a Z in the range of from 100 to 10000, or more usually a Z between 500 and 2000, or selecting Z to be 1000. Note that these same ranges may alternatively be specified as a time period equivalent to the number of frames. Alternatively, the stopping criteria may be (b) stop after more than Q seconds have expired since the first frame was acquired, such as for example to stop at some time period between 2 seconds and 10 seconds, more usually between 3 and 6 seconds, and in one embodiment after seconds (Q=5 seconds).

Therefore while is will be appreciated that using the afore described stopping criteria where the thresholds are functions of the sensor frame rate and the inventive algorithm assesses whether a frame is noise or whether the finger has moved, various other criteria, rules, policies, or procedures may be used for stopping.

Embodiment of Correlation Calculation Executed on Separate Hardware

In another alternative embodiment, the correlation (NCC) calculation is performed on separate general purpose or special purpose hardware, such as within a second processor, micro-controller, or special purpose hardware. Because correlation is computationally intensive, it is also possible to off load the calculation of $\Delta x(i)$ and $\Delta y(i)$ at each iteration to a separate processor or dedicated special purpose hardware. In this case, the special purpose hardware might be integrated into the silicon fingerprint sensor itself or as a separate chip or circuit on a different substrate. All that is necessary for this to work is for the hardware doing the correlation to have access to the current frame and the first few rows of the reconstructed image. If for example this special hardware is integrated into the sensor, such a device would already have access to the current frame (since the device itself created it), and the first few rows of the reconstructed image is made available to the device, or the device itself may reconstruct the image itself using the Δx(i) and Δy(i). If the latter is done, it is desirable for the sensor to keep in memory only the first few rows of the reconstructed image—not all of it—so as not to require large amounts of storage on board the chip. If storing the entire image on the device is not a problem, or if it is advantageous to do (for example for security reasons), then the entire reconstructed image may be created on the device and it would not need to send individual frames to the host computer.

ADDITIONAL EMBODIMENTS

While many embodiments of the invention have been described relative to a fingerprint biometric and to fingerprint biometric images acquired from multiple fingerprint swipe sensor output frames, it will be appreciated that the methods and procedures for accepting or rejecting a biometric frame based on content, for determining its position relative to an existing partially reconstructed image, and for generating or building up that image in pieces, are applicable to many different biometric sensors as well as to a multiplicity of image types and sources, and to all manner of scanner devices. For example, the inventive method may be applied to document scanning to stitching together linear scan lines of a document, particularly if there is some scanner velocity variation that requires or benefits from the frame by frame or line by line analysis to determine frame content and overlap.

All section headers provided herein are for the convenience of the reader and it will be appreciated that these headers do not limit the scope of the description or invention in any way as various aspects, features, and embodiments are described throughout the specification and shown in the drawings.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method for acquiring a plurality of biometric image frames from a sensor and generating a reconstructed composite image from at least some of said plurality of acquired biometric image frames, said method comprising:
   (a) acquiring a frame from said sensor and storing the acquired frame in a memory as a last stored frame;
   (b) comparing the stored frame to the reconstructed composite image to determine any usefulness and any alignment registration relationship between the acquired frame and said reconstructed composite image that is being generated;
   (c) updating the generated reconstructed composite image to incorporate at least a portion of the acquired frame to extend the length (height) of the generated reconstructed composite image and storing the updated generated reconstructed composite image in a memory;
   (d) determining if frame acquisition should be stopped according to a frame acquisition stop criteria; and
   (e) if it is determined that frame acquisition should be stopped then stopping acquiring frames and identifying the then currently updated generated reconstructed composite image as the final generated reconstructed composite image, and otherwise repeating the procedure of acquiring additional frames through determining if frame acquisition should be stopped until it is determined that frame acquisition should be stopped.

2. A method as in claim 1, further comprising prior to said acquiring a frame from said sensor, performing one or more of: initializing said sensor and adjusting an operating condition of said sensor.

3. A method as in claim 1, further comprising after said acquiring said frame from said sensor, estimating or determining properties of said acquired frame.

4. A method as in claim 3, further comprising retrieving information from the stored frame to use in estimating or determining said frame properties.

5. A method as in claim 4, wherein said estimating or determining frame properties including determining if a newly acquired frame has any new information as compared to the previous stored useful frame.

6. A method as in claim 1, further comprising after said acquiring said frame from said sensor, determining whether to keep or discard the acquired frame and keeping or discarding the acquired frame according to said keep/discard determination.

7. A method as in claim 6, wherein if the acquired frame is kept, storing the acquired stored frame as the last useful frame in a memory.

8. A method as in claim 1, wherein the comparing includes performing a correlation between at least a portion of the stored frame and a portion of the reconstructed composite image.

9. A method as in claim 8, wherein the correlation includes using statistics of the reconstructed image being generated.

10. A method as in claim 9, wherein said correlation comprises a normalized cross-correlation.

11. A method as in claim 10, wherein the normalized cross-correlation includes using statistics of the reconstructed image being generated.

12. A method as in claim 1, wherein the comparing includes using statistics of the reconstructed image being generated.

13. A method as in claim 1, further comprising updating the reconstructed image statistics including the contribution of the incorporated portion of the acquired frame.

14. A method as in claim 1, wherein said storing includes storing of said reconstructed image statistics in a memory in association with the updated generated reconstructed composite image.

15. A method as in claim 1, further comprising adjusting sensor settings after the updated generated reconstructed composite image is updated.

16. A method as in claim 1, further comprising adjusting sensor settings if the last acquired frame was discarded and not used for reconstruction, prior to the acquisition of the next frame.

17. A method as in claim 1, wherein said stop criteria is selected from the group of stop criteria consisting of: a total number of frames captured, a number of consecutive frames captured where no finger movement is observed, a number of consecutive frames captured where no biometric data is determined to exist, and combinations thereof.

18. A method as in claim 1, wherein said biometric comprises a fingerprint biometric.

19. A method as in claim 18, wherein the comparing comprise performing a correlation or performing the mathematically or functionally equivalent of a correlation.

20. A method as in claim 18, wherein the comparing comprises performing a normalized cross correlation or performing the mathematically or functionally equivalent of a normalized cross correlation.

21. A method as in claim 18, wherein said fingerprint biometric comprises a region of a human fingerprint less than the total region of a human fingerprint biometric needed for fingerprint identification by matching.

22. A method as in claim 1, further comprising generating and storing post-reconstruction image information about the final generated reconstructed composite image.

23. A method as in claim 22, wherein the post-reconstruction image information are stored with the final generated reconstructed composite image.

24. A method as in claim 22, wherein the post-reconstruction image information are encoded or stored with the final generated reconstructed composite image data set.

25. A method as in claim 22, wherein the post-reconstruction image information are encoded or stored in a header record of the final generated reconstructed composite image data set.

26. A method as in claim 22, wherein the post-reconstruction image information comprises statistical information.

27. A method as in claim 22, wherein the statistical information is selected from the set of statistical metrics consisting of: a final reconstructed image height, an angle of swipe, a speed of swipe, and combinations thereof.

28. A method as in claim 1, wherein the frame is a scan of an imaged portion of a fingerprint, and said final generated reconstructed composite image is a larger imaged portion of said fingerprint.

29. A method as in claim 28, further comprising performing minutiae identification and extraction on said final generated reconstructed composite fingerprint image.

30. A method as in claim 28, wherein said sensor is a swipe sensor that acquires a plurality of frames at a frame rate of said sensor, and said acquiring, comparing, updating, and determining, are performed in real-time according to said sensor frame acquisition rate.

31. A method as in claim 28, wherein said sensor is a swipe sensor that acquires a plurality of frames at a frame rate of said sensor, and said acquiring is performed in real-time according to said sensor frame acquisition rate and said comparing and updating are performed in non-real-time using a plurality of prior stored acquired frames.

32. A method for generating a reconstructed image from a plurality of acquired biometric image frames, said method comprising:
acquiring a frame from said sensor and storing the acquired frame;
comparing the acquired frame to a partially reconstructed image to determine any usefulness and any alignment registration relationship between the acquired frame and said reconstructed composite image that is being generated;
updating the generated reconstructed image to incorporate at least a portion of the acquired frame to extend the length (height) of the generated reconstructed composite image and storing the updated generated reconstructed composite image in a memory;
determining if frame acquisition should be stopped according to a frame acquisition stop criteria; and
if it is determined that frame acquisition should be stopped then stopping acquiring frames and identifying the then currently updated generated reconstructed composite image as the final generated reconstructed composite image, and otherwise repeating the procedure of acquiring additional frames through determining if frame acquisition should be stopped until it is determined that frame acquisition should be stopped.

33. A method as in claim 32, wherein said biometric comprises a fingerprint biometric.

34. A method as in claim 33, wherein the comparing comprise performing a correlation or performing the mathematically or functionally equivalent of a correlation.

35. A method as in claim 34, wherein the comparing comprises performing a normalized cross correlation or performing the mathematically or functionally equivalent of a normalized cross correlation.

36. A method as in claim 33, wherein said fingerprint biometric comprises a region of a human fingerprint less than the total region of a human fingerprint biometric needed for fingerprint identification by matching.

37. A method as in claim 32, further comprising performing an analysis of the content of the acquired frame to determine if it contains any useful fingerprint biometric information.

38. A method as in claim 37, wherein the determination of whether there is any useful fingerprint information in a collected frame is a pattern based determination.

39. A method as in claim 37, wherein the determination of whether there is any useful fingerprint information in a collected frame is an image statistic based determination using measured frame image statistics including an average value and a variance of at least a portion of the acquired frame.

40. A method as in claim 39, wherein said portion comprises the entire acquired frame.

41. A method as in claim 39, wherein said portion comprises a number of frame pixel elements less than the entire acquired frame.

42. A method as in claim 39, wherein the frame or partial frame average value M is given by the expression:

$$FrameAverage = \Phi = C1 \times \frac{\sum_{n=1}^{N}\sum_{m=1}^{M} \text{frame}[n, m]}{N \times M} + C2,$$

where frame[n,m] is the value of a pixel in the $n^{th}$ row and $m^{th}$ column of the frame or partial frame of the acquired frame having N rows and M columns, and C1 and C2 are constants representing a scale factor and an offset respectively.

43. A method as in claim 42, wherein the frame or partial frame variance $\Psi$ is given by the by the expression:

$$FrameVariance = \Psi = C3 \times \frac{\sum_{n=1}^{N}\sum_{m=1}^{M} \text{frame}[n, m] - (\Phi)^2}{N \times M} + C4$$

where frame[n,m] is the value of a pixel in the $n^{th}$ row and $m^{th}$ column of the frame or partial frame of the acquired frame having N rows and M columns and $\Phi$ is the frame average M, and C3 and C4 are constants representing a scale factor and an offset respectively.

44. A method as in claim 43, wherein the acquired frame is determined to contain only noise rather than any biometric information if the frame average is: (i) equal to or above a high noise average threshold value, (ii) equal to or below a low noise average threshold value, or (iii) the frame variance is less than or equal to a variance average threshold value according to:

$\Phi \geq$ Noise_average_threshold_high or if
$\Phi \leq$ Noise_average_threshold_low, or if
$\Psi \leq$ Variance_average_threshold.

45. A method as in claim 37, wherein the determination as to whether the acquired frame contains any new biometric information comprises determining the correlation, cross-correlation, normalized correlation, or normalized cross-correlation between the last stored useful acquired frame and the current acquired frame.

46. A method as in claim 45, wherein all of the pixels in each of the last stored useful acquired frame and the current acquired frame are compared by correlation or normalized cross-correlation.

47. A method as in claim 45, wherein fewer than all rows of pixels in each of the last stored useful acquired frame and the current acquired frame are compared by correlation or normalized cross-correlation.

48. A method as in claim 45, wherein one row of pixels in the last stored useful acquired frame and the same row of pixels in the current acquired frame are compared by correlation or normalized cross-correlation.

49. A method as in claim 45, wherein the any new biometric information determination cross-correlation comprises a cross-correlation (Correlation(R,d)) of row R of the last useful acquired frame (lastFrame[R,m]) with row R of the current acquired frame (curtFrame[R,m-d]) according to the expression:

$$\text{Correlation}(R, d) = C5 \times \sum_{m=d+1}^{M-d} (lastFrame[R, m] \times curFrame[R, m-d]) + C6,$$

where d is lag and is related to the horizontal movement of pixel values in one frame with respect to the pixel values in the other frame, and C5 and C6 are constants representing a scale factor and an offset respectively.

50. A method as in claim 49, wherein d is set to be equal to zero (d=0) for detecting lack of movement.

51. A method as in claim 49, wherein the cross-correlation is maximized if the pixel values in each of the last stored useful acquired frame and the currently acquired frame are identical and lack of movement is determined by comparing the correlation expression value Correlation(R,0) with a movement detection correlation threshold value so that there is assessed to be insufficient movement to constitute new information when the correlation value is greater than or equal to the movement correlation threshold value, or:
Correlation (R, 0) $\geq$ Movement_correlation_threshold.

52. A method as in claim 51, wherein the correlation comprises a movement detection normalized cross correlation.

53. A method as in claim 52, wherein the movement detection normalized cross-correlation is substantially invariant to changes in image pixel gray-level or intensity value which may result from changes in finger contact pressure, sensor bias or gain drift, sensor automatic gain control (AGC) changes.

54. A method as in claim 53, wherein the movement detection normalized cross-correlation has a range due to the normalization component that is substantially independent of the number of frame pixels used in the normalized cross-correlation calculation.

55. A method as in claim 53, wherein the movement detection normalized cross-correlation is more accurate than other non-normalized comparisons or correlations because it is less dependent on local properties of the image frames being correlated.

56. A method as in claim 53, wherein the movement detection normalized cross-correlation is determined for any of: a row, a plurality of rows, a patch or region of a frame, where a patch or region of a frame may be equal to a row, a subset of a row, a superset of a plurality of rows, or a collection of subsets or supersets of a plurality of rows.

57. A method as in claim 56, wherein the patches of each frame to be correlated are any arbitrary set of pixels.

58. A method as in claim 56, wherein the patches of each frame to be correlated are the middle row of each frame.

59. A method as in claim 56, wherein the movement detection normalized cross correlation (NCC) for patches (P) of a frame is given by the expression:

$$NCC(P, d) = C9 \times \frac{\sum_{m=d+1}^{M-d} \{lastFrame[P, m] - \overline{lastFrame}[P, d]\} \times \{curFrame[P, m-d] - \overline{curFrame}[P, d]\}}{\sqrt{\sum_{m=d+1}^{M-d} \{lastFrame[P, m] - \overline{lastFrame}[P, d]\}^2 \sum_{m=d+1}^{M-d} \{curFrame[P, m-d] - \overline{curFrame}[P, d]\}^2}} + C10$$

where: NCC(P,d) is the normalized cross-correlation of the patch P of the last useful acquired frame with patch P of the current acquired frame for a lag value of d, C9 and C10 are constants representing a scale factor and an offset respectively, curFrame[P,m] is the gray-level value of the pixel at patch P and column m of the current frame, lastFrame[P,m] is the gray-level value of the pixel at patch P and column m of the last frame, $$\overline{lastFrame}[P, d] = \frac{\sum_{m=d+1}^{M-d} \{lastFrame[P, m]\}}{M - |d|},$$

is the average of patch P from column d+1 through column M−d, and $$\overline{curFrame}[P, d] = \frac{\sum_{m=|d|+1}^{M-|d|} \{curFrame[P, m]\}}{M - |d|},$$

is the average of patch P from column d+1 through column M−d, and |d| is the absolute value of d.

60. A method as in claim 52, wherein the movement detection normalized cross correlation (NCC) for rows (or regions) R of a frame is given by the expression:

61. A method as in claim 60, wherein the currently acquired frame is determined to have no movement relative to the last stored useful acquired frame if the normalized movement detection cross-correlation NCC is greater than a movement detection normalized cross-correlation threshold value given by the expression: NCC>Movement_NCC_threshold.

62. A method as in claim 61, wherein movement detection normalized cross-correlation threshold (movement_NCC_threshold) has a value between substantially 0.8 and substantially 0.99 for an NCC range of 0 and 1.0 or an equivalent range of movement detection normalized cross-correlation threshold for an NCC scaled and or offset by a scaling constant and/or an offset bias.

63. A method as in claim 61, wherein movement detection normalized cross-correlation threshold (Movement_NCC_threshold) has a value of substantially 0.95 for an NCC range of 0 and 1.0 or an equivalent range of movement detection normalized cross-correlation threshold for an NCC scaled and or offset by a scaling constant and/or an offset bias.

64. A method as in claim 52, wherein the movement detection normalized Cross-Correlation NCC(R,d) at row or region R and a lag of d is determined, for the columns in row or region R, by summing the following terms for each pixel in row or region R and then dividing by a normalization: (a) the difference of each pixel in row or region R of the last frame to the average value of that row or region, and (b) the difference of each pixel in row or region R of the current $$NCC(R, d) = C7 \times \frac{\sum_{m=d+1}^{M-d} \{lastFrame[R, m] - \overline{lastFrame}[R, d]\} \times \{curFrame[R, m-d] - \overline{curFrame}[R, d]\}}{\sqrt{\sum_{m=d+1}^{M-d} \{lastFrame[R, m] - \overline{lastFrame}[R, d]\}^2 \sum_{m=d+1}^{M-d} \{curFrame[R, m-d] - \overline{curFrame}[R, d]\}^2}} + C8$$

where: NCC(R,d) is the normalized cross-correlation of the row R of the last useful acquired frame with row R of the current acquired frame for a lag value of d, C7 and C8 are constants representing a scale factor and an offset respectively, curFrame[R,m] is the gray-level value of the pixel at row R and column m of the current frame, lastFrame[R,m] is the gray-level value of the pixel at row R and column m of the last frame, $$\overline{lastFrame}[R, d] = \frac{\sum_{m=d+1}^{M-d} \{lastFrame[R, m]\}}{M - |d|},$$

is the average of row R from column d+1 through column M−d, and $$\overline{curFrame}[R, d] = \frac{\sum_{m=|d|+1}^{M-|d|} \{curFrame[R, m]\}}{M - |d|},$$

is the average of row R from column d+1 through column M−d, and |d| is the absolute value of d.

frame to the average value of that row or region where the column is offset by d, and multiplying the two above terms (a) and (b); and dividing the sum by a normalization term so that the movement detection normalized cross-correlation ranges from 0 to 1.

65. A method as in claim 32, wherein the comparing further comprising correlating the acquired frame to the partially reconstructed image.

66. A method as in claim 65, wherein the first acquired frame is determined to have useful and new information without correlating the acquired frame to partially reconstructed image, the because there is no prior acquired frame or partially reconstructed image for performing the correlation, and storing the first acquired frame as the partially reconstructed image.

67. A method as in claim 65, wherein the correlating comprises a frame matching correlation of the latest acquired useful frame to the partially reconstructed image is performed to determine the alignment registration of the latest acquired useful frame to the generated or reconstructed image.

68. A method as in claim 67, wherein said frame matching correlation comprises a frame matching normalized cross-correlation.

69. A method as in claim 68, wherein the frame matching normalized cross correlation NCC(R,S,d) of row R of the reconstructed image to row S of the current frame for a lag of d, is given by the expression:

$$NCC(R, S, d) = C11 \times \frac{\sum_{m=d+1}^{M-d} \{reconImage[R, m] - \overline{reconImage}[R, d]\} \times \{curFrame[S, m-d] - \overline{curFrame}[S, d]\}}{\sqrt{\sum_{m=d+1}^{M-d} \{reconImage[R, m] - \overline{reconImage}[R, d]\}^2 \sum_{m=d+1}^{M-d} \{curFrame[S, m-d] - \overline{curFrame}[S, d]\}^2}} + C12.$$

70. A method as in claim 69, wherein NCC(R,S,d) is calculated for a plurality of values of d to find the one value of d that corresponds to the best fit since the lag of the information in the current acquired frame relative to the lag in the partially reconstructed image is not known beforehand.

71. A method as in claim 70, wherein NCC(R,S,d) is selected as the NCC(R,S,d) for which NCC(R,S,L) is equal to the maximum value of MAX{NCC(R,S,d) over the range of d from −L to +L where L is the lag value, as follows:

PeakNCC(R,S,L)=MAX{NCC(R,S,d)} for d=−L to d=L, and the peak value of d ($d_{peak}$(R,S,L)) is equal to the value of d at which PeakNCC(R,S,L) is satisfied, that is:

$d_{peak}$(R,S,L)=the value of d at which the above equation is satisfied.

72. A method as in claim 71, wherein L is chosen so that it is at least as large as the maximum x-velocity (Δx(i)) that can occur from frame to frame.

73. A method as in claim 72, wherein L is chosen to be in the range of 10 to 50 frame columns.

74. A method as in claim 72, wherein L is chosen to be in the range of 20 to 30 frame columns.

75. A method as in claim 72, wherein L is chosen to be substantially 25 frame columns.

76. A method as in claim 71, wherein L is a function of the $d_{peak}$ from the last frame acquisition and image generation reconstruction iteration i−1.

77. A method as in claim 71, wherein L is chosen to be L(at iteration i)=$d_{peak}$ (at iteration i−1)+e, where e is an integer related to the maximum movement of the finger from one frame to the next frame.

78. A method as in claim 32, wherein the updating comprising generating a reconstructed image sequentially from the acquired frames.

79. A method as in claim 78, wherein generating the reconstructed image includes select the row S in of the current frame to be equal to the number of row N (S=N) so that there is a high confidence that if the user is not swiping the finger too quickly, row S of the reconstructed image will correlate and be a duplicate of one of the rows N of the current acquired frame.

80. A method as in claim 79, wherein said normalized cross-correlation calculation generates values for row S of the current frame as follows: (i) bestMatchRow, the row of the reconstructed image that results in the highest correlation value; (ii) MaxPeakNCC, the value of the correlation of the best matching row of the reconstructed image to the one in the current frame; and (iii) $d_{peak}$Max, the correlation lag where MaxPeakNCC is reached.

81. A method as in claim 32, further comprising determining a fingertip swipe x-velocity and a fingertip swipe y-velocity for use in reconstructing a fingerprint image for fingerprint acquisition operation where the user swipes the finger too quickly for consecutive frames to overlap.

82. A method as in claim 81, wherein the determining a fingertip swipe x-velocity and a fingertip swipe y-velocity comprises a deterministic calculation based on measured values.

83. A method as in claim 81, wherein the determining a fingertip swipe x-velocity and a fingertip swipe y-velocity comprises an estimate based on prior historical velocity values.

84. A method as in claim 81, wherein the x-velocity Δx(i) at iteration i and the y-velocity Δy(i) at iteration i is determined differently for two different conditions: (i) if the maximum peak NCC (MaxPeakNCC) is greater than the frame matching correlation threshold (corr_threshold), or MaxPeakNCC>corr_threshold, then: Δx(i)=$d_{peak}$Max and Δy(i)=N-(best Match Row); and (ii) otherwise if MaxPeakNCC≦corr_threshold), then: the x-velocity is chosen to be the x-velocity of the previous iteration i−1 (Δx(i)= Δx(i−1)), and the y-velocity is chosen to be equal to N (Δy(i)=N), where N is the number of rows.

85. A method as in claim 84, where in the frame matching correlation threshold value (corr_threshold) is selected to be in the range from 0.6 to 0.99 for an NCC range of 0 and 1.0 or an equivalent range of movement detection normalized cross-correlation threshold for an NCC scaled and or offset by a scaling constant and/or an offset bias.

86. A method as in claim 81, wherein the x-velocity and y-velocity calculation is repeated to obtain information for some or all of the rows in the current frame.

87. A method as in claim 86, wherein said some of all of the rows in the current frame consists of row N of the current frame.

88. A method as in claim 86, wherein said some of all of the rows in the current frame comprise a plurality or rows of the current frame.

89. A method as in claim 88, wherein when said correlation calculation is performed for a plurality of rows, then at each frame acquisition and image reconstruction iteration i, a plurality of values of Δx(i) and Δy(i) for each frame row are obtained.

90. A method as in claim 89, wherein when a plurality of values of Δx(i) and Δy(i) for each frame row are obtained, a final pair of velocities used in the image reconstruction at this iteration i are calculated by taking the statistical mode of each above-threshold velocity, finalΔx(i) and final Δy(i)

as: Final Δx(i)=MODE{set of all Δx(i) where MaxPeakNCC>corr_threshold, and Final Δy(i)=MODE{set of all Δy(i) where MaxPeakNCC>corr_threshold}, unless there are no above-threshold velocities found in which situation the estimates are: Final Δx(i)=Δx(i−1), and Final Δy(i)=N.

91. A method as in claim 90, wherein the a Final Δx(i) and Final Δy(i) identify where the new frame belongs with respect to the reconstructed image and the reconstructed image is updated by adding the new frame to the previous partial reconstructed image to obtain a new reconstructed image that includes the additional acquired frame.

92. A method as in claim 32, further comprising, after the updating of the reconstructed image, updating reconstructed image statistics.

93. A method as in claim 92, wherein the reconstructed image statistics computed when a predetermined number of frames are added to the reconstructed image are selected from the set consisting of: final Δx(i) and final Δy(i) of the current $i^{th}$ frame relative to the reconstructed image; Height(i)=Height(i−1)+Δy(i), the reconstructed image height, equal to the new total number of rows in the partially reconstructed image; i=total_frames_used and equal to the total number of iterations is equal to the total frames used thus far in the reconstruction; the count of the number of iterations where the MaxPeakNCC correlation is below threshold; the number of consecutive frames discarded due to noise; the number of consecutive frames discarded due to no finger on sensor, and combinations thereof.

94. A method as in claim 93, wherein the reconstructed image statistics are used to stop the frame acquisition process.

95. A method as in claim 93, wherein the reconstructed image statistics are used to calculate a speed of swipe and an angle of the swipe.

96. A method as in claim 32, further comprising testing a frame acquisition stopping criteria to decide when to stop acquiring additional frames.

97. A method as in claim 96, wherein the stopping criteria comprises a frame based stopping criteria to terminate the frame acquisition process.

98. A method as in claim 97, wherein the frame based stopping criteria comprises a procedure wherein frame acquisition and image generation or reconstruction is stopped if: (i) more than some number F of consecutive frames discarded due to noise, or (ii) more than some number G of consecutive frames have been discarded due to non-movement of the finger, or (iii) more than some number K of total frames have already been acquired.

99. A method as in claim 98, wherein F, G, and K are numbers that depend on the sensor frame rate and ensure that frame acquisition and image reconstruction systems operating at different frame rates behave similarly, since F, G and K are normalized to units of time and compensate for different frame rates.

100. A method as in claim 99, wherein the compensation for slower and faster systems facilitates comparable performance across many different systems, so that such frame acquisition and image reconstruction rate differences will not be readily apparent in operation to the person using the system.

101. A method as in claim 32, further comprising, after the determining that frame acquisition should be stopped, calculating post final image reconstruction information including calculation of a final height of the reconstructed image, an angle of swipe, and a speed of swipe.

102. A method as in claim 101, wherein the final height of the reconstructed image=Height(i)=H.

103. A method as in claim 101, wherein the angle of swipe=arctan[H/Σ{Δx(i)}], where the sum or all of the x-velocities (Σ{Δx(i)}) is the sum of the Δx(i) over all iterations where Δy(i)>0.

104. A method as in claim 101, wherein the speed of swipe=average number of new rows added per frame= [Σ{Δy(i)}/total_frames_used].

105. A method as in claim 32, further comprising embedding information into the reconstructed image.

106. A method as in claim 105, wherein information identifying characteristics of the biometric and its acquisition characteristics are attached stored in a token identified to the generated reconstructed image.

107. A method as in claim 105, wherein information identifying characteristics of the biometric and its acquisition are embedded into the generated reconstructed image.

108. A method as in claim 105, wherein the embedded information is embedded within a predetermined portion of the reconstructed image in place of selected image pixels.

109. A method as in claim 105, wherein the embedded information is embedded within the reconstructed image as a separate record.

110. A method as in claim 105, wherein the embedded information is embedded within a predetermined portion of the reconstructed image in place of image pixels.

111. A method as in claim 105, wherein the embedded information is selected from the set of information items consisting of: a unique identifier enabling detection of the presence of the embedded information block in the reconstructed biometric image; a record or header version identifier; a sensor identifier including one or more of a sensor vendor identifier, a sensor model identifier, and a sensor type identifier; a reconstructed image height; a reconstructed image width; an angle of swipe; a swipe speed; a set of x-velocity values at each row of the reconstructed image; a bad correlation count identifying the number of iterations where the maximum peak normalized cross-correlation was below the correlation threshold value; and combinations thereof.

112. A method as in claim 111, wherein the information further includes information about the type of processor or computer used, time information, date information, Cyclic Redundancy Check (CRC) codes to verify integrity of the data, and combinations thereof.

113. A method as in claim 32, further comprising acquiring a new frame and performing an analysis of the content of the acquired frame to determine if it contains any fingerprint biometric information;

said determination of whether there is any fingerprint information in a collected frame is an image statistic based determination using measured frame image statistics including an average value and a variance of at least a portion of the acquired frame;

said frame or partial frame average value M is given by the expression:

$$FrameAverage = \Phi = C13 \times \frac{\sum_{n=1}^{N}\sum_{m=1}^{M} \text{frame}[n, m]}{N \times M} + C14,$$

where frame[n,m] is the value of a pixel in the $n^{th}$ row and $m^{th}$ column of the frame or partial frame of the acquired frame having N rows and M columns, and C13 and C14 are constants representing a scale factor and an offset respectively;

said frame or partial frame variance Ψ is given by the by the expression:

$$FrameVariance = \Psi = C15 \times \frac{\sum_{n=1}^{N}\sum_{m=1}^{M}(\text{frame}[n,m] - \Phi)^2}{N \times M} + C16$$

where frame[n,m] is the value of a pixel in the $n^{th}$ row and $m^{th}$ column of the frame or partial frame of the acquired frame having N rows and M columns and Φ is the frame average M, and C15 and C16 are constants representing a scale factor and an offset respectively; and said acquired frame is determined to contain only noise rather than any biometric information if the frame average is: (i) equal to or above a high noise average threshold value, (ii) equal to or below a low noise average threshold value, or (iii) the frame variance is less than or equal to a variance average threshold value according to:

Φ≧Noise_average_threshold_high, or if

Φ≦Noise_average_threshold low, or if

Ψ≦Variance average_threshold.

114. A computer readable medium encoded with a computer program which when executed performs a method for acquiring a plurality of biometric image frames from a sensor and generating a reconstructed composite image from at least some of said plurality of acquired biometric image frames, said method comprising:
(a) acquiring a frame from said sensor and storing the acquired frame in a memory as a last stored frame;
(b) comparing the stored frame to the reconstructed composite image to determine any usefulness and any alignment registration relationship between the acquired frame and said reconstructed composite image that is being generated;
(c) updating the generated reconstructed composite image to incorporate at least a portion of the acquired frame to extend the length (height) of the generated reconstructed composite image and storing the updated generated reconstructed composite image in a memory;
(d) determining if frame acquisition should be stopped according to a frame acquisition stop criteria; and
(e) if it is determined that frame acquisition should be stopped then stopping acquiring frames and identifying the then currently updated generated reconstructed composite image as the final generated reconstructed composite image, and otherwise repeating the procedure of acquiring additional frames through determining if frame acquisition should be stopped until it is determined that frame acquisition should be stopped.

115. A computer readable medium encoded with a computer program which when executed performs a method for generating a reconstructed image from a plurality of acquired biometric image frames, said method comprising:

acquiring a frame from said sensor and storing the acquired frame;
comparing the acquired frame to a partially reconstructed image to determine any usefulness and any alignment registration relationship between the acquired frame and said reconstructed composite image that is being generated;
updating the generated reconstructed image to incorporate at least a portion of the acquired frame to extend the length (height) of the generated reconstructed composite image and storing the updated generated reconstructed composite image in a memory;
determining if frame acquisition should be stopped according to a frame acquisition stop criteria; and
if it is determined that frame acquisition should be stopped then stopping acquiring frames and identifying the then currently updated generated reconstructed composite image as the final generated reconstructed composite image, and otherwise repeating the procedure of acquiring additional frames through determining if frame acquisition should be stopped until it is determined that frame acquisition should be stopped.

116. A system for generating a reconstructed biometric from a plurality of biometric image frames acquired from a biometric sensor, said system comprising:
means for acquiring a frame from said biometric sensor and storing the acquired frame;
means for comparing the acquired frame to a partially reconstructed image to determine any usefulness and any alignment registration relationship between the acquired frame and said reconstructed composite image that is being generated;
means for updating the generated reconstructed image to incorporate at least a portion of the acquired frame to extend the length of the generated reconstructed composite image and storing the updated generated reconstructed composite image in a memory;
means for determining if frame acquisition should be stopped according to a frame acquisition stop criteria;
means for stopping acquiring frames if it is determined that frame acquisition should be stopped and for identifying the then currently updated generated reconstructed composite image as the final generated reconstructed composite image; and
means for repeating the procedure of acquiring additional frames through determining if frame acquisition should be stopped until it is determined that frame acquisition should be stopped.

117. A system as in claim 116, wherein said biometric comprises a fingerprint biometric.

118. A system as in claim 116, wherein said biometric sensor comprises a biometric swipe sensor.

119. A system as in claim 116, wherein said means for acquiring, means for comparing, means for updating, means for determining, means for stopping, and means for repeating comprises at least one computer program stored in a memory and executing within a processor to generate said reconstructed image.

120. A system as in claim 116, wherein said biometric comprises a fingerprint biometric image.

121. A system as in claim 116, wherein said biometric comprises a fingerprint minutiae biometric.

* * * * *